(12) United States Patent
Kowarz et al.

(10) Patent No.: US 6,411,425 B1
(45) Date of Patent: Jun. 25, 2002

(54) ELECTROMECHANICAL GRATING DISPLAY SYSTEM WITH SPATIALLY SEPARATED LIGHT BEAMS

(75) Inventors: Marek W. Kowarz, Rochester; John C. Brazas, Jr., Hilton; James G. Phalen, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/671,040

(22) Filed: Sep. 27, 2000

(51) Int. Cl.[7] .................. G02B 26/00; G02B 26/02; G02B 5/18
(52) U.S. Cl. .................. 359/291; 359/231; 359/572
(58) Field of Search .................. 359/223, 225, 359/290, 291, 298, 227, 230, 231, 572

(56) References Cited

U.S. PATENT DOCUMENTS

| | | | |
|---|---|---|---|
| 4,441,791 A | 4/1984 | Hornbeck | 359/295 |
| 4,626,920 A | 12/1986 | Glenn | 348/775 |
| 4,857,978 A | 8/1989 | Goldburt et al. | 257/239 |
| 5,170,283 A | 12/1992 | O'Brien et al. | 359/291 |
| 5,258,775 A * | 11/1993 | Casey | 347/255 |
| 5,311,360 A * | 5/1994 | Bloom | 359/572 |
| 5,459,610 A | 10/1995 | Bloom et al. | 359/572 |
| 5,661,592 A | 8/1997 | Bornstein et al. | 359/291 |
| 5,677,783 A | 10/1997 | Bloom et al. | 359/224 |
| 5,808,797 A * | 9/1998 | Bloom | 359/572 |
| 5,822,110 A * | 10/1998 | Dabbaj | 359/293 |
| 5,841,579 A | 11/1998 | Bloom et al. | 359/572 |
| 5,844,711 A | 12/1998 | Long, Jr. | 359/291 |
| 5,982,553 A * | 11/1999 | Bloom | 359/627 |
| 6,084,626 A * | 7/2000 | Ramanujan | 347/239 |
| 6,088,102 A | 7/2000 | Manhart | 356/499 |
| 6,215,579 B1 * | 4/2001 | Bloom | 359/298 |
| 6,307,663 B1 * | 10/2001 | Kowarz | 359/231 |

OTHER PUBLICATIONS

W. Brinker et al., Metallized viscoelastic control layers for light–valve projection displays, Displays 16, 1994, pp. 13–20.
H. Roder et al., Full–colour diffraction–based optical system for light–valve projection displays, Displays 16, 1995, pp. 27–34.

* cited by examiner

*Primary Examiner*—Georgia Epps
*Assistant Examiner*—Gary O'Neill
(74) *Attorney, Agent, or Firm*—Stephen S. Shaw

(57) ABSTRACT

A display system, that includes a light source for providing illumination; a linear array of electromechanical grating devices of at least two individually operable devices receiving the illumination wherein a grating period is oriented at a predetermined angle with respect to an axis of the linear array wherein the angle is large enough to separate diffracted light beams prior to a lens system for projecting light onto a screen; an obstructing element for blocking a discrete number of diffracted light beams from reaching the screen; a scanning element for moving non-obstructed diffracted light beams on the screen; and a controller for providing a data stream to the individually operable devices.

52 Claims, 25 Drawing Sheets

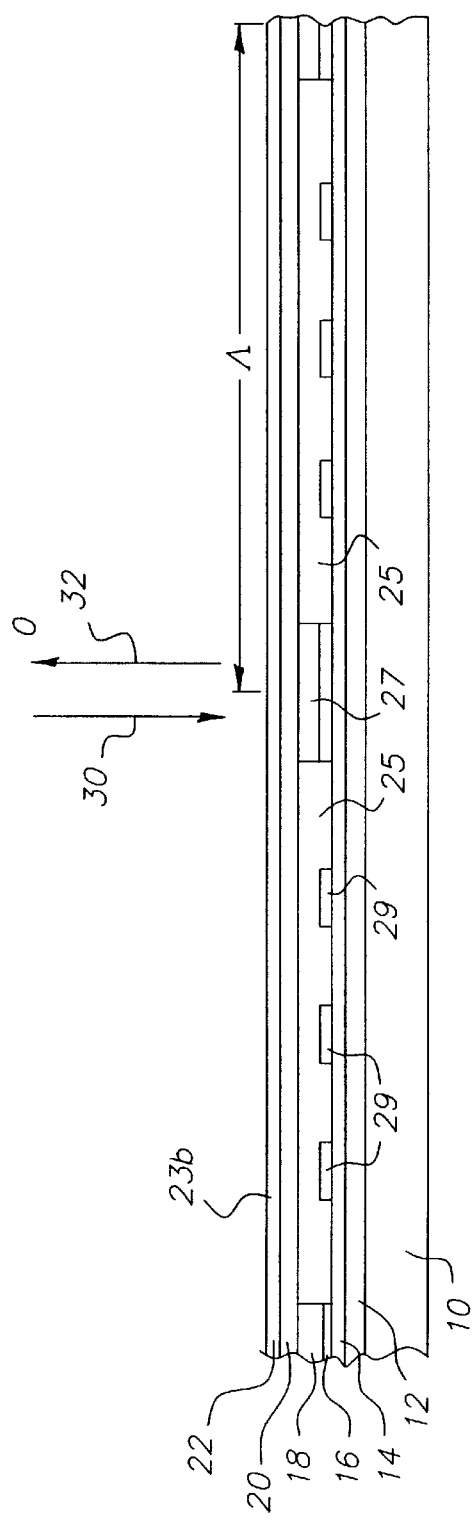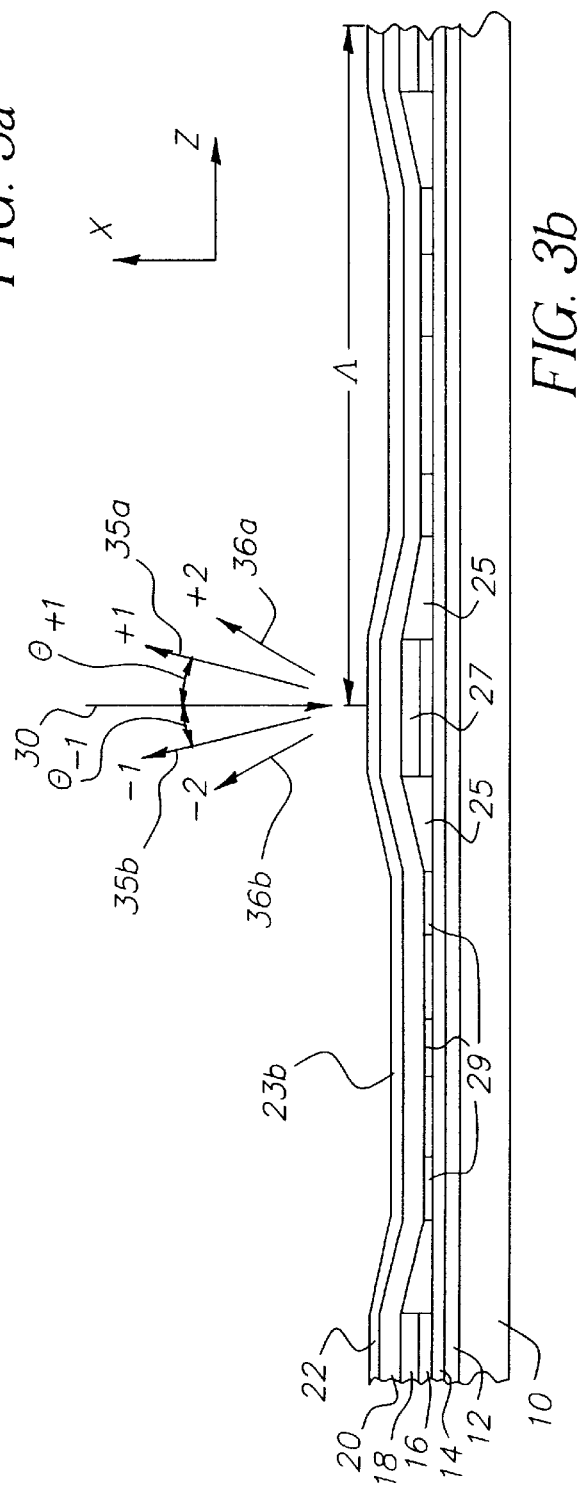

ELECTROMECHANICAL GRATING DISPLAY SYSTEM WITH SPATIALLY SEPARATED LIGHT BEAMS

FIELD OF THE INVENTION

This invention relates to a display system with a linear array of electromechanical grating modulators that is scanned in order to generate a two-dimensional image. More particularly, the invention relates to an electromechanical grating display system that has spatially separated diffracted light beams throughout the system.

BACKGROUND OF THE INVENTION

Electromechanical spatial light modulators with a variety of designs have been used in applications such as display, optical processing, printing, optical data storage and spectroscopy. These modulators produce spatial variations in the phase and/or amplitude of an incident light beam using arrays of individually addressable devices.

Spatial phase modulation of an incident beam can be accomplished by arrays of individually addressable deformable mirrors. Such devices can be made by suspending a deformable reflective membrane over a grid of supports, as described U.S. Pat. No. 4,441,791 issued Apr. 10, 1984 to Hornbeck entitled Deformable Mirror Light Modulator. However, because of the membrane and support structure, these particular deformable mirrors are very inefficient. More efficient deformable mirror designs are disclosed in U.S. Pat. No. 5,170,283 issued Dec. 8, 1992 to O'Brien et al. entitled Silicon Spatial Light Modulator, and in U.S. Pat. No. 5,844,711 issued Dec. 1, 1998 to Long, Jr. entitled Tunable Spatial Light Modulator.

Another class of electromechanical spatial light modulators has devices with a periodic sequence of reflective elements that form electromechanical phase gratings. In such devices, the incident light beam is selectively reflected or diffracted into a number of light beams of discrete orders. Depending on the application, one or more of these diffracted light beams may be collected and used by the optical system. For many applications, electromechanical phase gratings are preferable to deformable mirrors. Electromechanical phase gratings can be formed in metallized elastomer gels; see U.S. Pat. No. 4,626,920 issued Dec. 2, 1986 to Glenn entitled Solid State Light Modulator Structure, and U.S. Pat. No. 4,857,978 issued Aug. 15, 1989 to Goldburt et al. entitled Solid State Light Modulator Incorporating Metallized Gel and Method of Metallization. The electrodes below the elastomer are patterned so that the application of a voltage deforms the elastomer producing a nearly sinusoidal phase grating. These types of devices have been successfully used in color projection displays; see *Metallized viscoelastic control layers for light-valve projection displays,* by Brinker et al., Displays 16, 1994, pp. 13–20, and *Full-colour diffraction-based optical system for light-valve projection displays,* by Roder et al., Displays 16, 1995, pp. 27–34.

An electromechanical phase grating with a much faster response time can be made of suspended micromechanical ribbon elements, as described in U.S. Pat. No. 5,311,360 issued May 10, 1994 to Bloom et al. entitled Method and Apparatus for Modulating a Light Beam. This device, also known as a grating light valve (GLV), can be fabricated with CMOS-like processes on silicon. Improvements in the device were later described by Bloom et al. that included: 1) patterned raised areas beneath the ribbons to minimize contact area to obviate stiction between the ribbons and the substrate, and 2) an alternative device design in which the spacing between ribbons was decreased and alternate ribbons were actuated to produce good contrast; see U.S. Pat. No. 5,459,610 issued Oct. 17, 1995 entitled Deformable Grating Apparatus for Modulating a Light Beam and Including Means for Obviating Stiction between Grating Elements and Underlying Substrate. Bloom et al. also presented a method for fabricating the device; see U.S. Pat. No. 5,677,783 issued Oct. 14, 1997 entitled Method of Making a Deformable Grating Apparatus for Modulating a Light Beam and Including Means for Obviating Stiction Between Grating Elements and Underlying Substrate. Additional improvements in the design and fabrication of the GLV were described in U.S. Pat. No. 5,841,579 issued Nov. 24, 1998 to Bloom et al. entitled Flat Diffraction Grating Light Valve, and in U.S. Pat. No. 5,661,592 issued Aug. 26, 1997 to Bornstein et al. entitled Method of Making and an Apparatus for a Flat Diffraction Grating Light Valve.

For display or printing, linear arrays of GLV devices can be used with a scanning Schlieren optical system as described in U.S. Pat. No. 5,982,553 issued Nov. 9, 1999 to Bloom et al. entitled Display Device Incorporating One-Dimensional Grating Light-Valve Array. Alternatively, an interferometric optical system can be used to display an image as disclosed in U.S. Pat. No 6,088,102 issued Jul. 11, 2000 to Manhart entitled Display Apparatus Including Grating Light-Valve Array and Interferometric Optical System. In the scanning Schlieren display system of Bloom et al. '553, the plane of diffraction, which contains the diffracted light beams, is parallel to the axis of the linear GLV array because the grating period is parallel to the axis. This increases the cost and complexity of the display system. Specifically, efficient collection of the primary diffracted light beams requires at least one dimension of the optical elements to be significantly larger than the extent of the linear GLV array. Furthermore, the diffracted and reflected light beams overlap spatially throughout most of the optical system. Separation of diffracted light from reflected light is accomplished in close proximity to a Fourier plane of the Schlieren optical system. However, the Fourier plane is usually also the preferred location of a scanning mirror for producing a two-dimensional image.

Recently, a linear array of electromechanical conformal grating devices was disclosed by Kowarz in U.S. Ser. No. 09/491,354 filed Jan. 26, 2000 now U.S. Pat. No. 6,307,663. For this type of device, it is preferable to have the grating period perpendicular to the axis of the linear array. The diffracted light beams are then spatially separated throughout most of the optical system. In U.S. Ser. No. 09/491,354 now U.S. Pat. No. 6,307,663, it was mentioned that a simplified display system is possible to use with a new device. However, no specific description of the display system was given. There is a need therefore for a scanning display system that utilizes a linear array of electromechanical conformal grating devices. Furthermore, there is a need for a system that is simpler and less costly than prior art systems.

SUMMARY OF THE INVENTION

The need is met according to the present invention by providing a display system that includes a light source for providing illumination; a linear array of electromechanical grating devices of at least two individually operable devices receiving the illumination, wherein a grating period is oriented at a predetermined angle with respect to an axis of the linear array wherein the angle is large enough to separate diffracted light beams prior to a lens system for projecting light onto a screen; an obstructing element for blocking a discrete number of diffracted light beams from reaching the screen; a scanning element for moving non-obstructed diffracted light beams on the screen; and a controller for providing a data stream to the individually operable devices.

The present invention has several advantages, including: 1) improvement in contrast by eliminating reflections from projection lens, because of the new flexibility in placing the turning mirror between the linear array and the projection lens; 2) reduction in size of the scanning mirror, because now the scanning mirror can be placed directly at the Fourier plane; 3) increase in design flexibility, because now separation of diffracted orders can take place almost anywhere in the system, not just at the Fourier plane; and 4) reduction in size of lenses and other optical elements.

BRIEF DESCRIPTION OF THE DRAWINGS

FIGS. 3a and 3b are cross-sectional views through line 3–3 in FIG. 2, showing the operation of an electromechanical conformal grating device in an unactuated state and an actuated state, respectively;

DETAILED DESCRIPTION OF THE INVENTION

Figure 1:
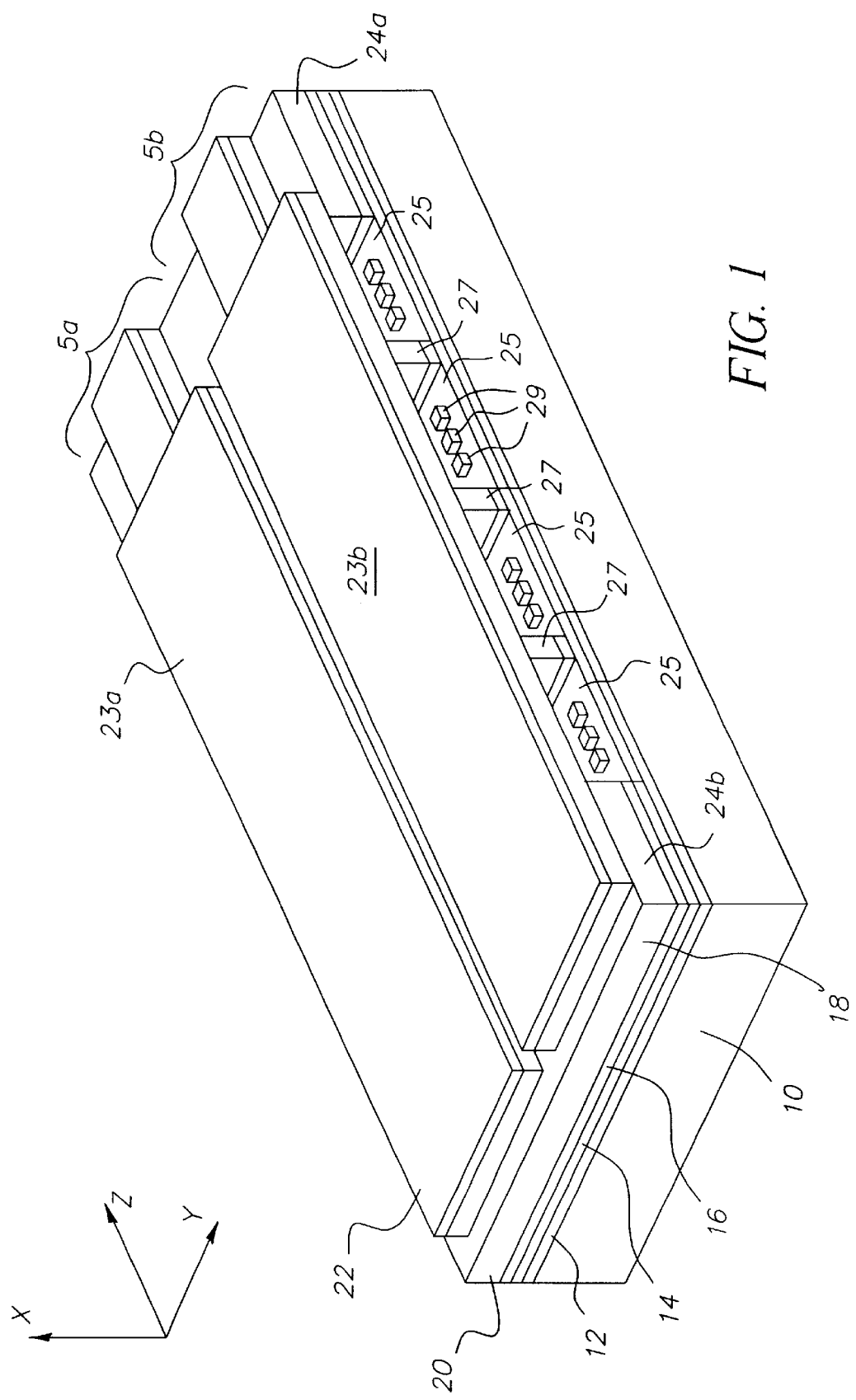
FIG. 1 is a perspective, partially cut-away view of a spatial light modulator with electromechanical conformal grating devices, showing two devices in a linear array.
Figure 2:
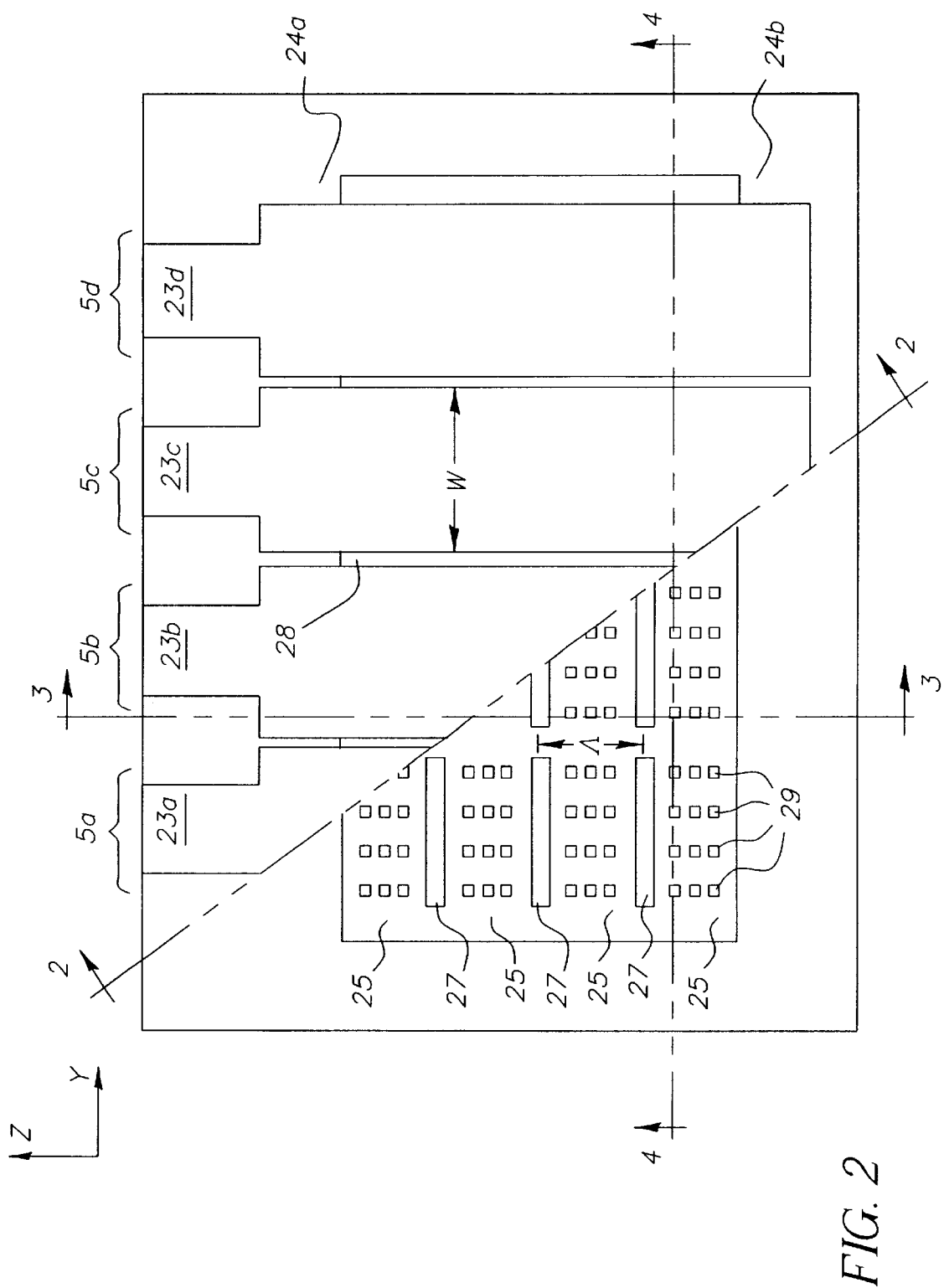
FIG. 2 is a top view of a spatial light modulator with electromechanical conformal grating devices, showing four individually operable devices in a linear array.

The structure and operation of an electromechanical conformal grating device is illustrated in FIGS. 1–3. FIG. 1 shows two side-by-side conformal grating devices 5a and 5b in an unactuated state. In this embodiment, the devices can be operated by the application of an electrostatic force. The grating devices 5a and 5b are formed on top of a substrate 10 covered by a bottom conductive layer 12 which acts as an electrode to actuate the devices. The bottom conductive layer 12 is covered by a dielectric protective layer 14 followed by a standoff layer 16 and a spacer layer 18. On top of the spacer layer 18, a ribbon layer 20 is formed which is covered by a reflective layer 22. The reflective layer 22 is also a conductor in order to provide electrodes for the actuation of the conformal grating devices 5a and 5b. The reflective and conductive layer 22 is patterned to provide electrodes to the two conformal grating devices 5a and 5b. The ribbon layer 20 preferably comprises a material with a sufficient tensile stress to provide a large restoring force. Each of the two devices 5a and 5b has an associated elongated ribbon element 23a and 23b, respectively, patterned from the reflective and conductive layer 22 and the ribbon layer 20. The elongated ribbon elements 23a and 23b are supported by end supports 24a and 24b formed from the spacer layer 18 and by one or more intermediate supports 27 that are uniformly separated in order to form four equal-width channels 25. The elongated ribbon elements 23a and 23b are secured to the end supports and to the intermediate supports 27. A plurality of square standoffs 29 is patterned at the bottom of the channels 25 from the standoff layer 14. These standoffs 29 reduce the possibility of the ribbon elements sticking when actuated.

A top view of a four-device linear array of conformal grating devices 5a, 5b, 5c and 5d is shown in FIG. 2. The elongated ribbon elements are depicted partially removed over the portion of the diagram below the line 2—2 in order to show the underlying structure. For best optical performance and maximum contrast, the intermediate supports 27 must be completely hidden below the elongated ribbon elements 23a, 23b, 23c and 23d. Therefore, when viewed from the top, the intermediate supports must not be visible in the gaps 28 between the conformal grating devices 5a–5d. Here each of the conformal grating devices has three intermediate supports 27 with four equal-width channels 25. The center-to-center separation A of the intermediate supports 27 defines the period of the conformal grating devices in the actuated state. The elongated ribbon elements 23a–23d are mechanically and electrically isolated from one another, allowing independent operation of the four conformal grating devices 5a–5d. The bottom conductive layer 12 of FIG. 1 can be common to all of the devices.

FIG. 3a is a side view, through line 3—3 of FIG. 2, of two channels 25 of the conformal grating device 5b (as shown and described in FIG. 1) in the unactuated state. FIG. 3b shows the same view of the actuated state. For operation of the device, an attractive electrostatic force is produced by applying a voltage difference between the bottom conductive layer 12 and the conducting layer 22 of the elongated ribbon element 23b. In the unactuated state (see FIG. 3a), with no voltage difference, the ribbon element 23b is suspended flat between the supports. In this state, an incident light beam 30 is primarily diffracted into a 0th order light beam 32 in the mirror direction. To obtain the actuated state, a voltage is applied to the conformal grating device 5b, which deforms the elongated ribbon element 23b and produces a partially conformal grating with period A. FIG. 3b shows the device 5b (as shown and described in FIG. 1) in the fully actuated state with the elongated ribbon element 23b in contact with the standoffs 29. The height difference between the bottom of element 23b and the top of the standoffs 29 is chosen to be approximately ¼ of the wavelength λ of the incident light. The optimum height depends on the specific shape of the actuated device. In the actuated state, the incident light beam 30 is primarily diffracted into the +1st order light beam 35a and −1st order light beam 35b, with additional light diffracted into the +2nd order 36a and −2nd order 36b. A small amount of light is diffracted into even higher orders and some is diffracted into the 0th order. One or more of the diffracted beams can be collected and used by the optical system, depending on the application. When the applied voltage is removed, the forces due to the tensile stress and bending restores the ribbon element 23b to its original unactuated state.

A linear array of conformal grating devices is formed by arranging the devices as illustrated in FIGS. 1–3 with the direction of the grating period Λ (the y direction) perpendicular to the axis of the array (the x direction). For a given incident angle, the planes containing the various diffracted light beams are distinct. These planes all intersect in a line at the linear array. Even with a large linear array consisting, possibly, of several thousand devices illuminated by a narrow line of light, the diffracted light beams become spatially separated over a relatively short distance. This feature simplifies the optical system design and enables feasible designs in which the separation of diffracted light beams can be done spatially without Schlieren optics.

Figures 4A, 4B:
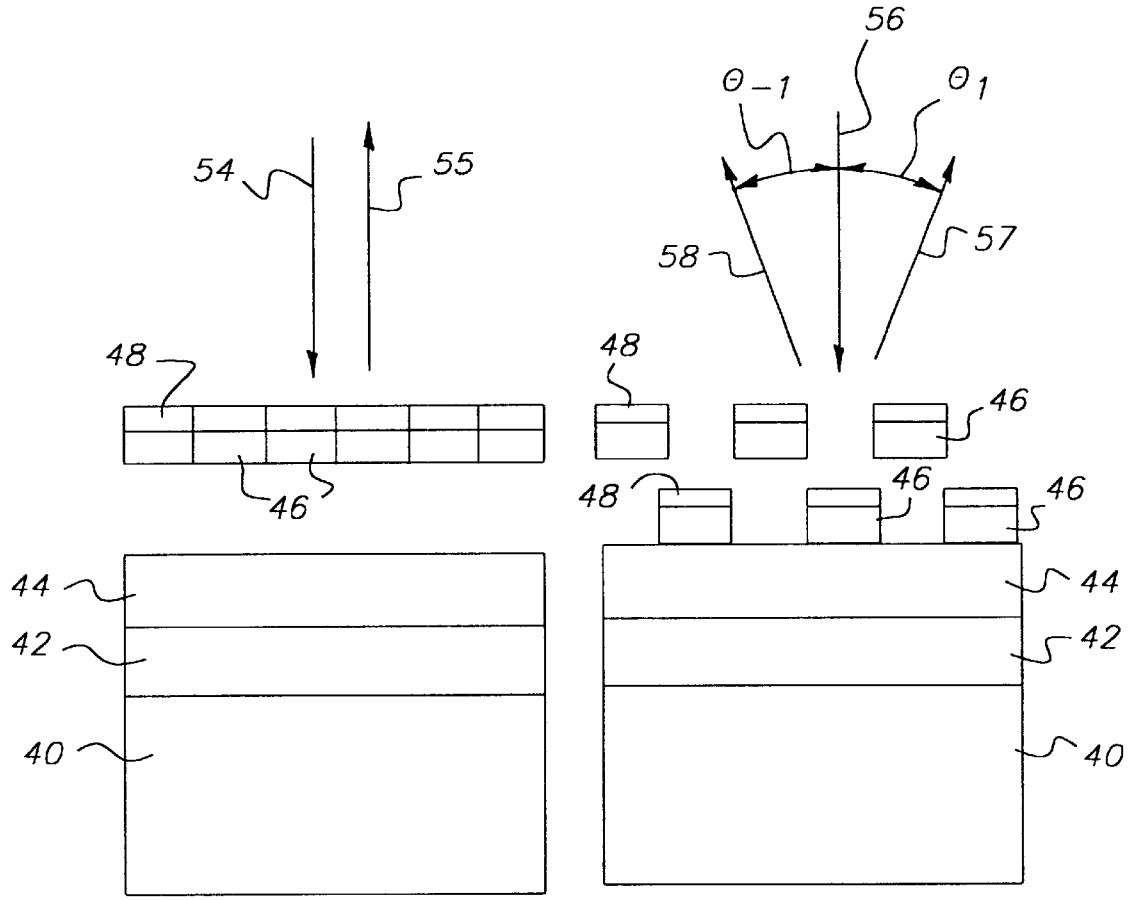
FIGS. 4a and 4b show the operation of a conventional electromechanical two-level grating device in an unactuated state and an actuated state, respectively.

A conventional Grating Light Valve (GLV) is shown in FIGS. 4a and 4b. FIG. 4a depicts the ribbon structure of the device in the unactuated state and FIG. 4b in the actuated state. For operation of the device, an attractive electrostatic force is produced by a voltage difference between the bottom conductive layer 42 and the reflective and conductive layer 48 atop the ribbon element 46. In the unactuated state, with no voltage difference, all of the ribbon elements 46 in the GLV device are suspended above the substrate 40 at the same height. In this state, an incident light beam 54 is primarily reflected as from a mirror to form a 0th order diffracted light beam 55. To obtain the actuated state (see FIG. 4b), a voltage is applied to every other ribbon element 46 producing a grating. In the fully actuated state, every other ribbon element 46 is in contact with the protective layer 44. When the height difference between adjacent ribbons is ¼ of the wavelength of an incident light beam 56, the light beam is primarily diffracted into a +1st order light beam 57 and a −1st order light beam 58. One or more of the diffracted beams can be collected and used by an optical system, depending on the application. When the applied voltage is removed, the force due to the tensile stress restores the ribbon elements 46 to their original unactuated state (see FIG. 4a).

The table below summarizes the key differences between a conformal grating device and a conventional GLV for a single device of each type.

|  | Conformal grating device | Conventional GLV |
| --- | --- | --- |
| # of moving ribbons | 1 | 3–6 |
| # of stationary ribbons | none | 3–6 |
| Number of channels | >5 | 1 |
| Grating period direction | Parallel to ribbon length | Perpendicular to ribbon length |
| Grating profile | Smoothly varying | Square (binary) |

It should be noted that the parameters above pertain to the preferred forms of each of the devices.

Figure 5:
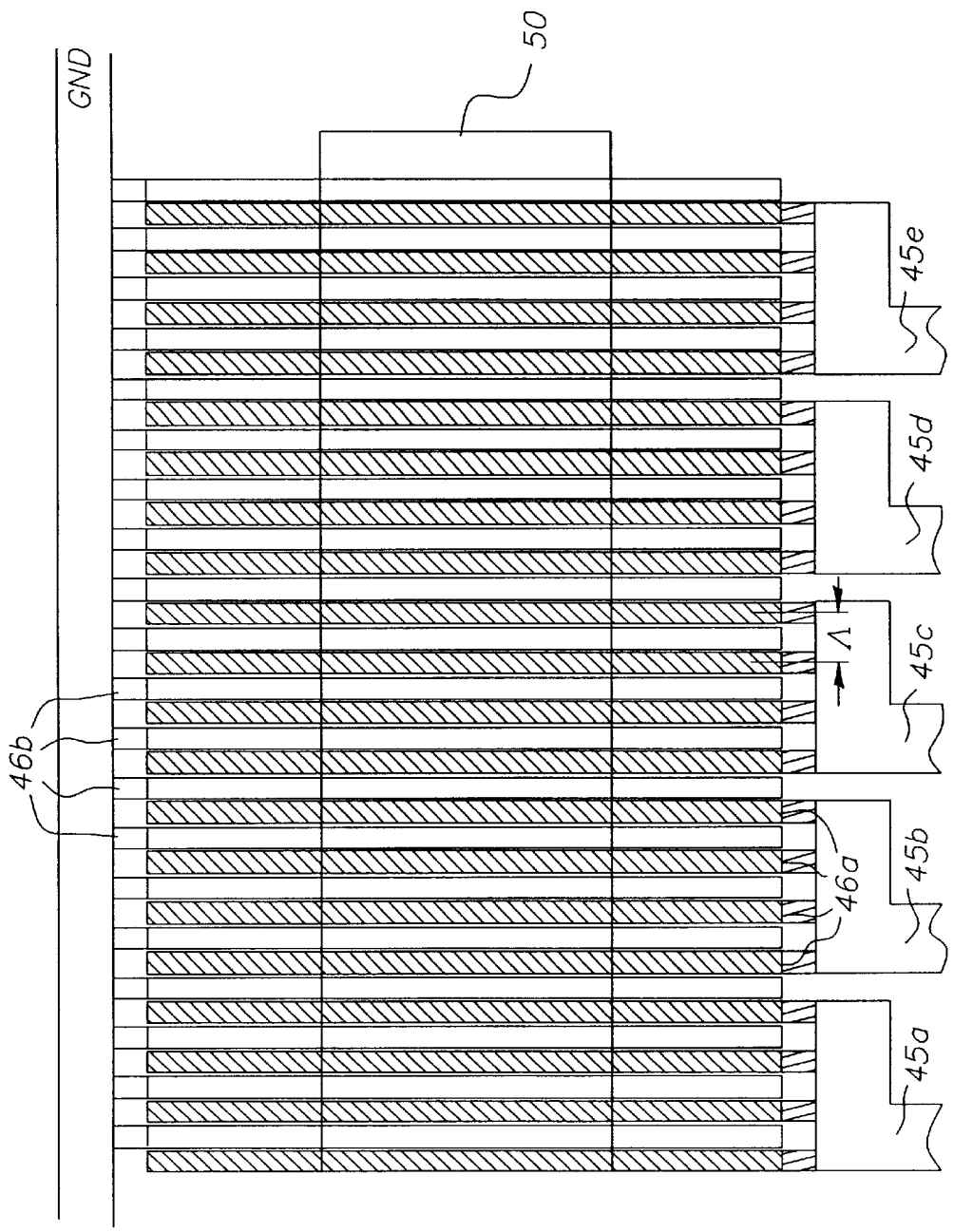
FIG. 5 is a top view of a spatial light modulator with conventional GLV devices, showing five individually operable devices in a linear array with deformable ribbon elements oriented perpendicular to the axis of the array and the grating period oriented parallel to the axis.

In a linear array made from conventional GLV devices, the ribbon elements are usually all arranged parallel to each other. FIG. 5 shows the top view of a portion of such a linear array. In this example, each of 5 devices 45a, 45b, 45c, 45d and 45e contains 4 movable ribbon elements 46a that are electrically connected to each other and 4 stationary ribbon elements 46b that are connected to ground. The application of a voltage to a device causes the movable ribbon elements 46a belonging to that device to actuate in unison into the channel 50. The grating period A formed by the actuated ribbons is parallel to the axis of the array and perpendicular to the length of the ribbon elements 46a and 46b. The diffracted light beams then overlap spatially over a relatively long distance.

As a comparative example between the two types of linear arrays, let us consider an array of conformal grating devices that is 4 cm long (2000 devices 20 μm wide) illuminated by a 100 μm wide line of light. For devices with a period chosen such that the diffracted orders are angularly separated by 1 rapid separation of diffracted orders occurs because the grating period is perpendicular to the axis of the linear array of conformal grating devices, and is parallel to the length of the ribbon elements. A similar 4 cm linear array of prior art GLV devices with a 4 degree angular separation between diffracted orders would require at least 60 cm for spatial separation, without the use of a Schlieren optical system. This relatively slow order separation occurs because the grating period is parallel to the axis of the linear array of GLV devices.

Figure 6:
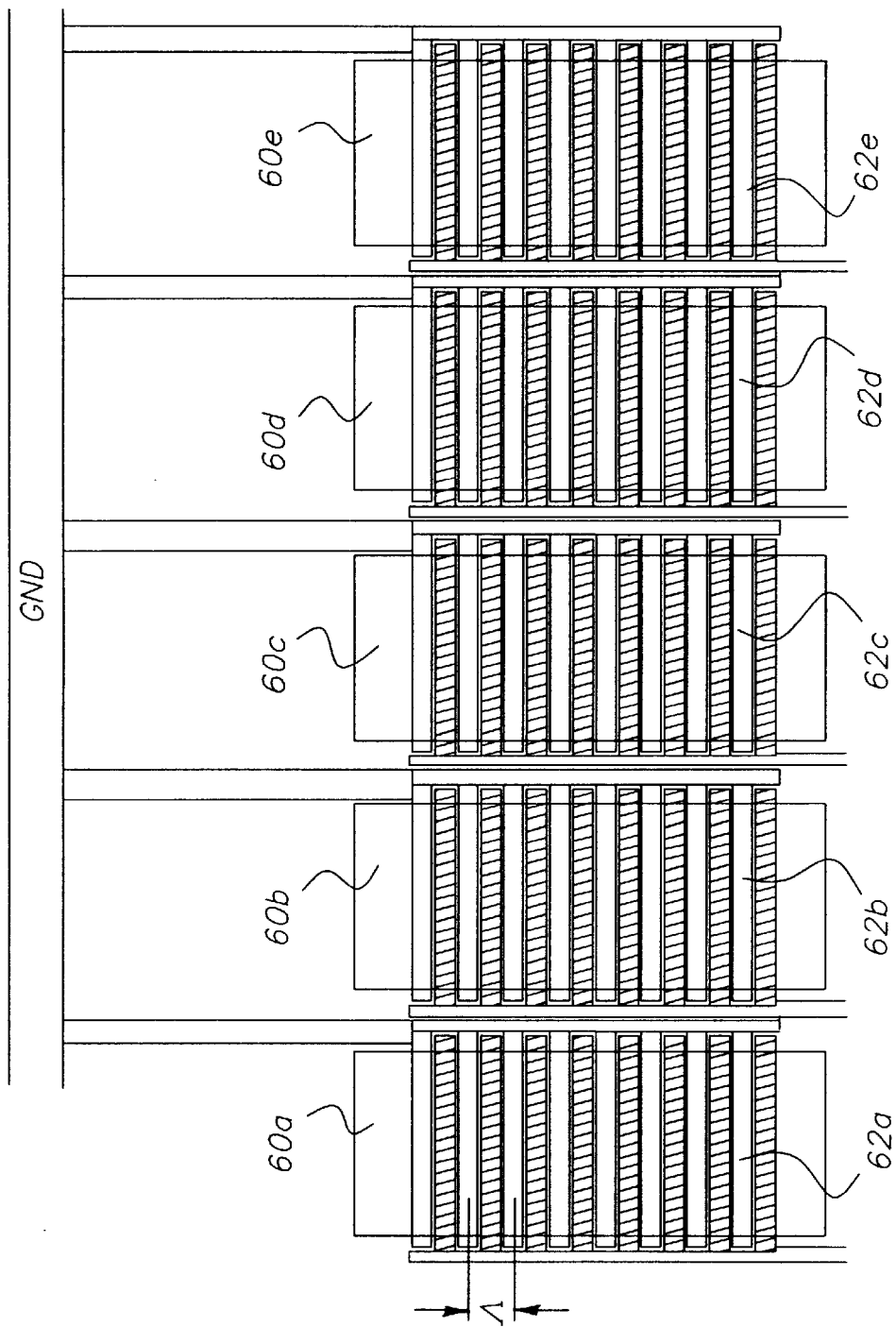
FIG. 6 is a top view of a spatial light modulator with conventional GLV devices, showing five individually operable devices in a linear array with deformable ribbon elements oriented parallel to the axis of the array and the grating period oriented perpendicular to the axis.

A linear array of GLV devices can also be constructed with the ribbons elements perpendicular to the axis of the array as illustrated in FIG. 6. Each of the 5 devices 62*a*, 62*b*, 62*c*, 62*d* and 62*e* is individually operable and has its own channel 60*a*, 60*b*, 60*c*, 60*d* and 60*e*. For such a GLV array, the grating period Λ is perpendicular to the axis of the array and the diffracted light beams become spatially separated over a relatively short distance. However, this type of GLV array suffers from the existence of significant gaps between devices that cause some pixelation in the display.

Figure 7:
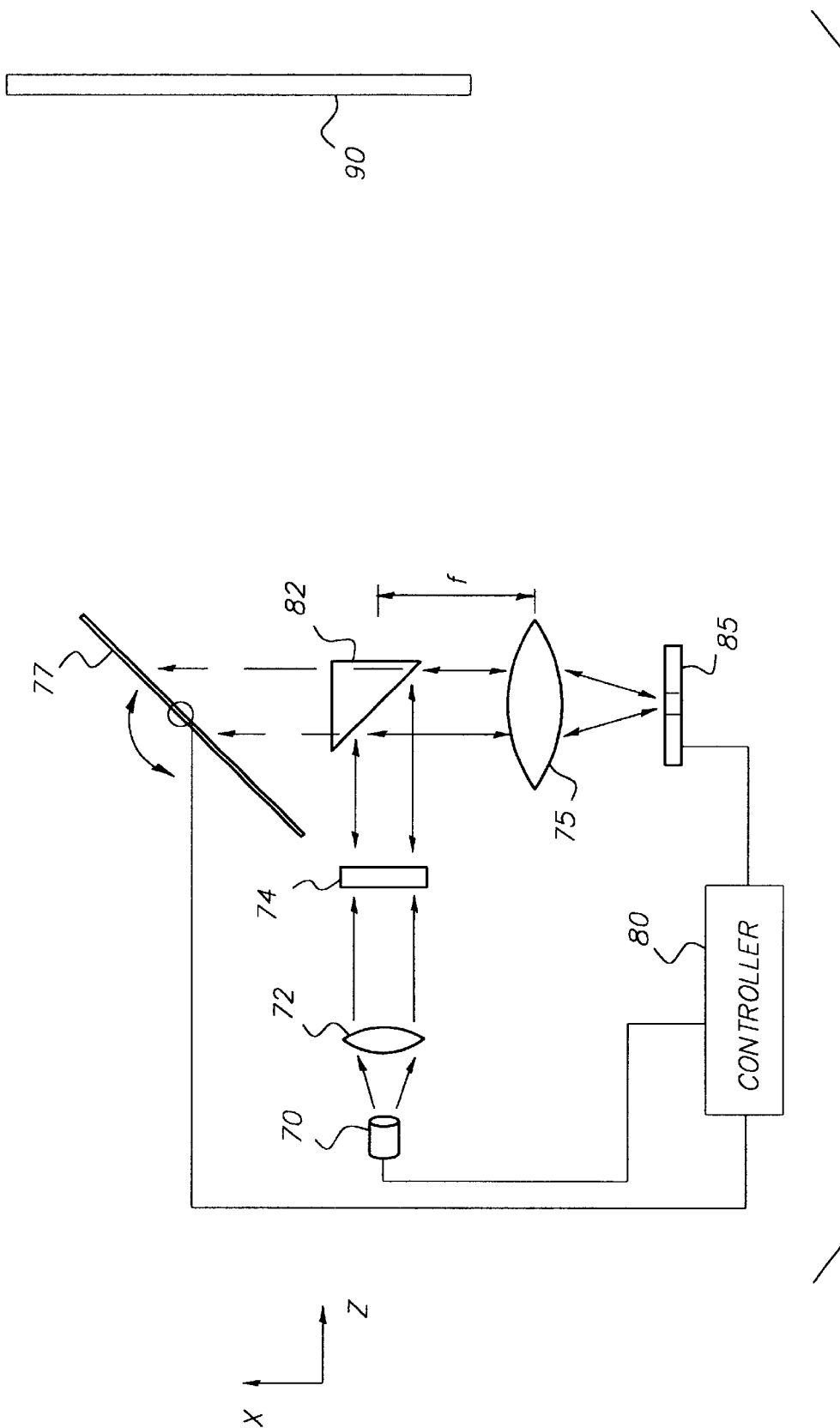
FIG. 7 is a schematic illustrating a prior art, line-scanned Schleiren display system that includes a light source, illumination optics, a linear array of conventional GLV devices, a projection lens, a scanning mirror, a controller and a turning mirror located at the Fourier plane of the projection lens.

FIG. 7 shows a GLV-based display system of the prior art that has a Schlieren optical system. The linear array 85 consists of GLV devices of the type shown in FIG. 5. Light is emitted from a source 70 and passes through a spherical lens 72 and a cylinder lens 74 before hitting a turning mirror 82. The turning mirror 82 is placed at the Fourier (focal) plane of a projection lens system 75. Although only a single lens element is shown, in practice, the projection lens system will consist of multiple elements. Light reflected by the turning mirror 82 is focused by the projection lens system 75 into a line illuminating the linear array 85. A small portion of the illumination that strikes the projection lens system 75 will be reflected. In order to avoid a reduction in the contrast of the display system from such reflections, the projection lens system 75 needs to have very good optical coatings and/or needs to be used off axis. The GLV devices of the linear array 85 are selectively activated by the controller 80 to correspond to a line of pixels. If a particular device of the array is actuated by application of a voltage to the ribbon elements, it diffracts light primarily into +1st order and –1st order light beams. If a particular device is not actuated, it diffracts light primarily into the 0th order light beam. These three primary light beams are collected by the same projection lens 75, which focuses the three light beams into distinct spots at the Fourier plane. The 0th order light beam hits the turning mirror 82 and is reflected towards the light source 70. The +1st and –1st order light beams pass above and below the turning mirror 82 and strike a scanning mirror 77 that sweeps the light beams across a screen 90 to form a viewable two-dimensional image. Higher-order light beams also show up as spots in the Fourier plane and can be blocked from reaching the screen 90 by a stop in the Fourier plane (not shown). The controller 80 synchronizes the sweep of the scanning mirror 77 with the actuation of the devices of the linear array 85.

In the prior art display system of FIG. 7, in order to effectively separate the +1st and –1st order light beams from the 0th order light beam, the turning mirror 82 must be placed near the Fourier plane of the projection lens system 75, i.e., it must be located at approximately the focal distance f from the lens. However, this location is also best for placing the scanning mirror 77 because the +1st and –1st order light beams are tightly focused here, allowing for a reduction in the size and weight of the scanning mirror 77.

Figure 8:
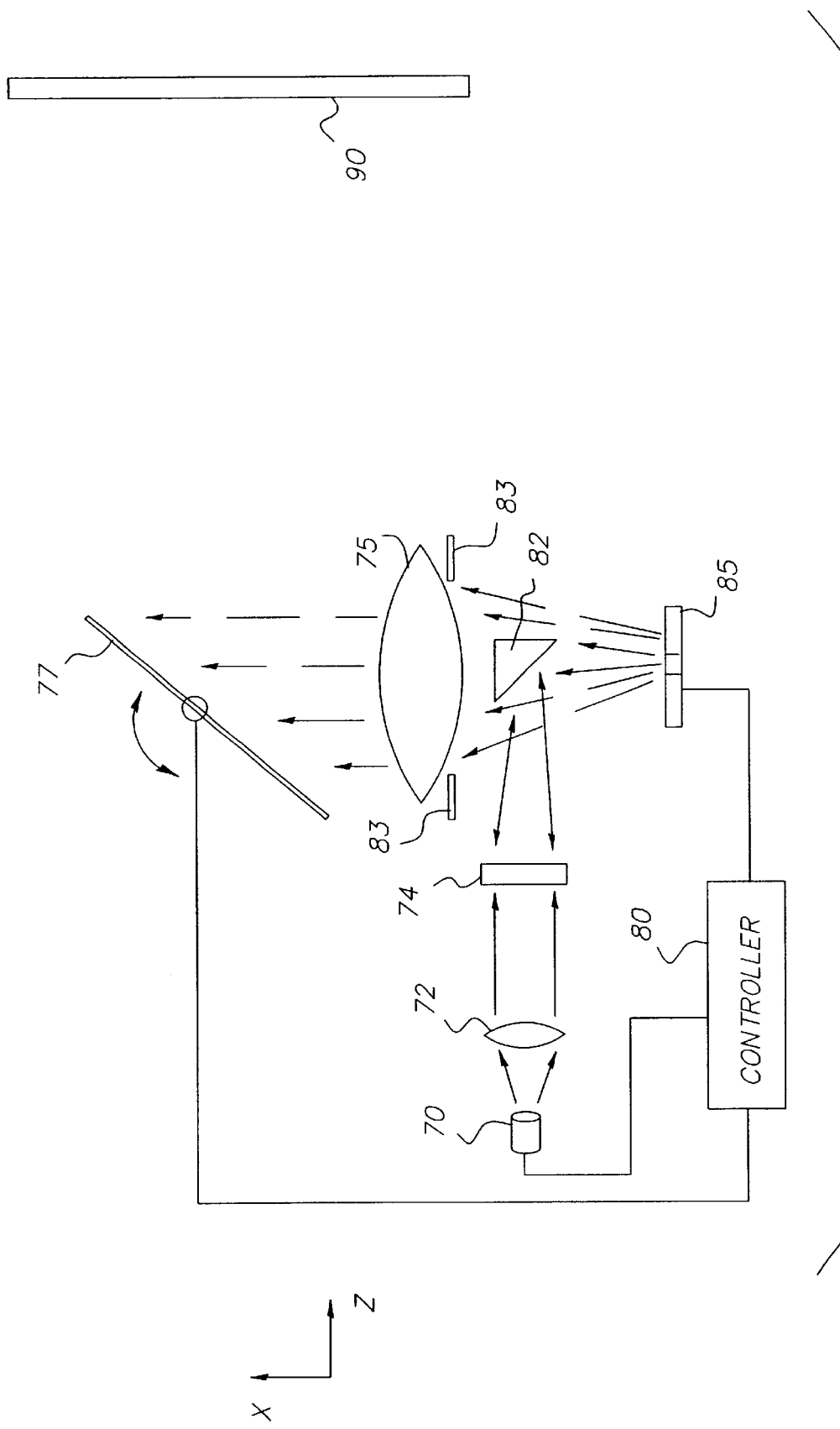
FIG. 8 is a schematic illustrating a line-scanned display system according to the present invention that includes a light source, illumination optics, a linear array of electromechanical conformal grating devices, a projection lens, a scanning mirror, a controller and a turning mirror located between the linear array and the projection lens.
Figure 9:
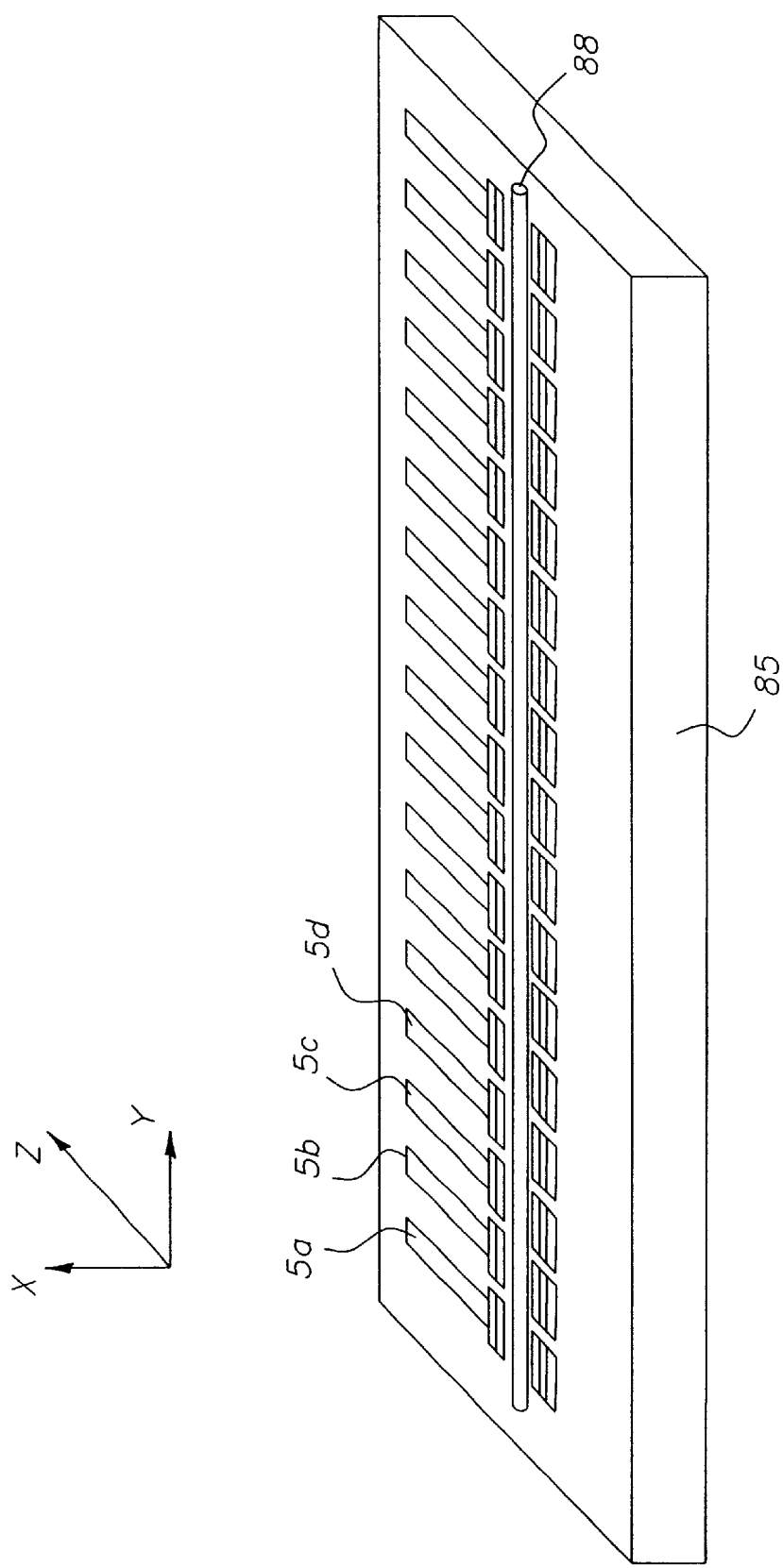
FIG. 9 shows a linear array of electromechanical conformal grating devices illuminated by a line of light.
Figure 10:
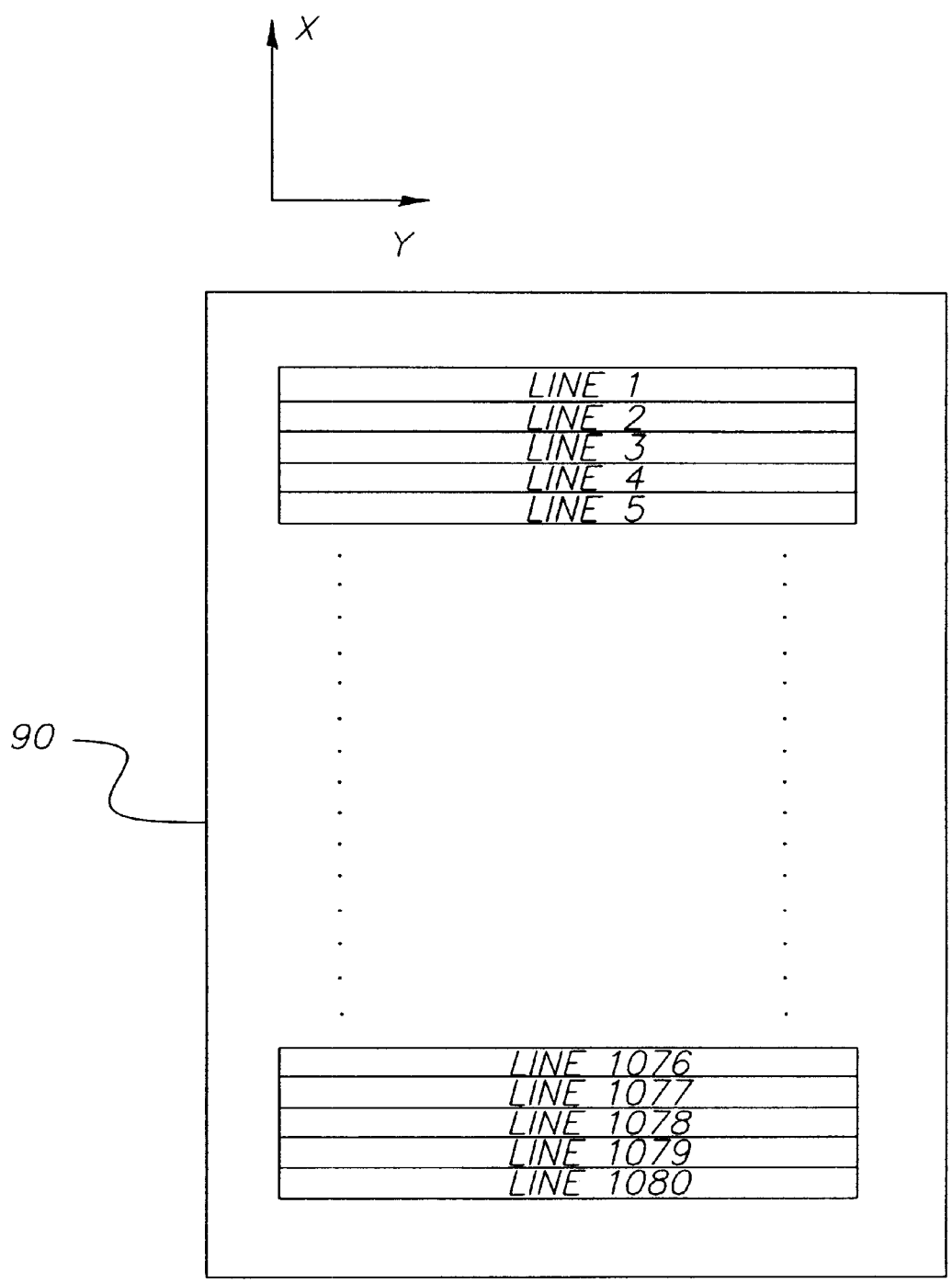
FIG. 10 is a view of the projection screen that illustrates the formation of a two-dimensional image by scanning a line image across the screen.

FIGS. 8–10 illustrate the preferred embodiment of the present invention. FIG. 8 shows the display system with a turning mirror 82 placed between the linear array 85 and the projection lens system 75. Light emitted by source 70 is conditioned by a spherical lens 72 and a cylindrical lens 74 before hitting the turning mirror 82 and focusing on the linear array 85. In this system, the axis of the cylindrical lens is rotated 90 degrees with respect to the cylindrical lens in FIG. 7. By placing the turning mirror 82 between the linear array 85 and the projection lens system 75, the contrast-reducing reflections of the prior art system of FIG. 8 are eliminated because the illuminating light beam never passes through the projection lens system 75. FIG. 9 shows the linear array 85 illuminated by a line of light 88. In this particular example there are 17 electromechanical conformal grating devices shown. In practice, there would be hundreds or thousands of devices. The controller 80 selects the devices to be actuated based on the desired pixel pattern for a given line of a two-dimensional image. If a particular device is not actuated, it diffracts the incident light beam primarily into the 0th order light beam, which subsequently hits the turning mirror 82 and is reflected towards the source 70. If the device is actuated, it diffracts the incident light beams primarily into +1st order and –1st order light beams. These two first-order diffracted light beams pass around the turning mirror 82 and are projected on the screen 90 by the projection lens system 75. Higher-order diffracted light beams can be blocked by the addition of a stop 83. The scanning mirror 77 sweeps the line image across the screen 90 to form the two-dimensional image. Preferably, the scanning mirror 77 is placed near the Fourier plane of the projection lens system 75. FIG. 10 is a view facing the screen 90 showing the formation of a two-dimensional image from a series of 1080 sequential line scans.

Clearly, there are two kinds of diffracted light beams in this display system: those that are blocked by obstructing elements from reaching the screen 90 and those that pass around obstructing elements to form an image on the screen 90. In this particular system, the obstructing elements are the turning mirror 82 that blocks the 0th order light beam and the stops 83 that block the ±2nd, ±3rd, ±4th, . . . orders of light. In the subsequent embodiments, similar obstructing elements are used to prevent unwanted diffracted light beams from reaching the screen. However, as is well known to those skilled in the art, other elements may be used for this purpose. For example, the stops 83 can be replaced by tilted mirrors.

The linear array 85 is preferably constructed of electromechanical conformal grating devices of the type shown in FIGS. 1–3. It may also be constructed of GLV devices of the type shown in FIG. 6, or of other kinds of electromechanical grating devices. However, in order to place the turning mirror 82 before the projection lens system 75, the grating period Λ must be rotated at a sufficiently large angle with respect to the long axis of the linear array 85. For the electromechanical conformal grating devices of FIGS. 1–3 and the GLV devices of FIG. 6, this angle is 90 degrees. A lesser angle can also be used so long as the diffracted orders become separated before reaching the projection lens system 75. It is impractical, however, to make this type of display system with no rotation between the grating period and the axis of the linear array 85. A conventional linear array of GLV devices of the type shown in FIG. 5 can therefore not be used with this kind of system.

Figure 11A:
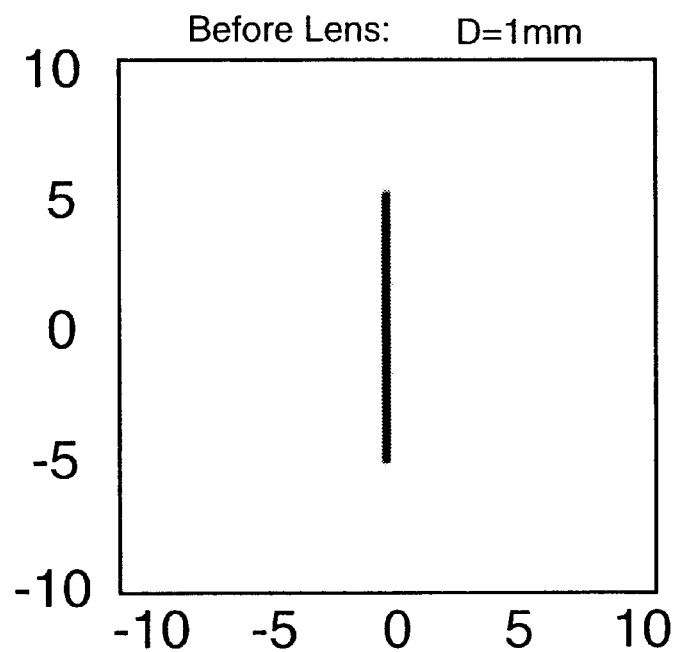
FIGS. 11a–11h are density plots of the light distribution in different planes of a prior art, line-scanned Schleiren display system in which the modulator is a linear array of conventional GLV devices with deformable ribbon elements oriented perpendicular to the axis of the array.
Figure 11B:
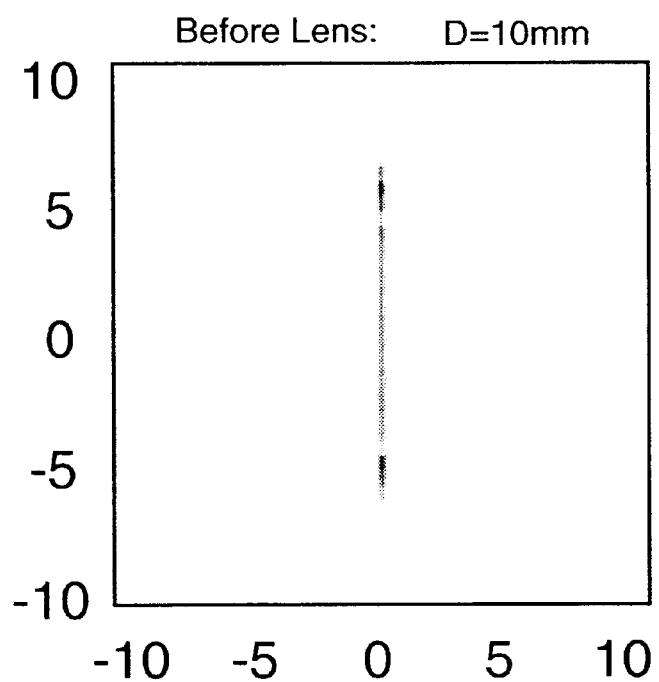
Figure 11C:
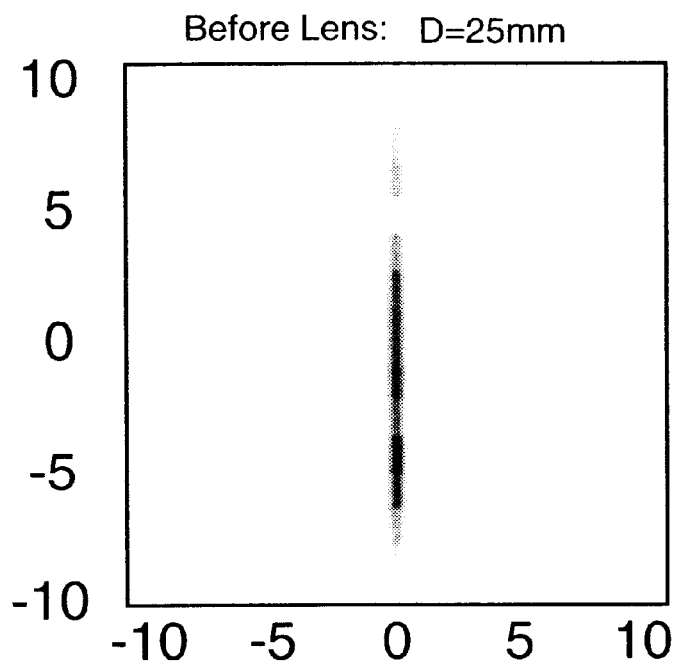
Figure 11D:
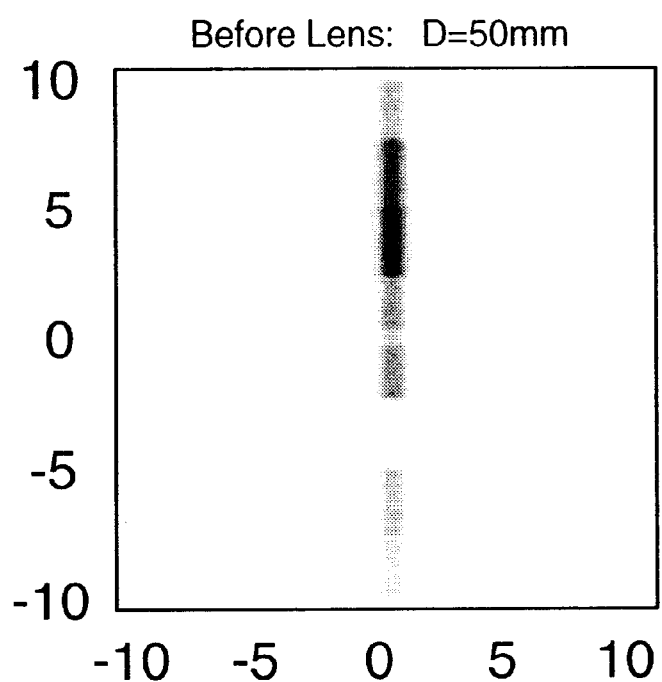
Figure 11E:
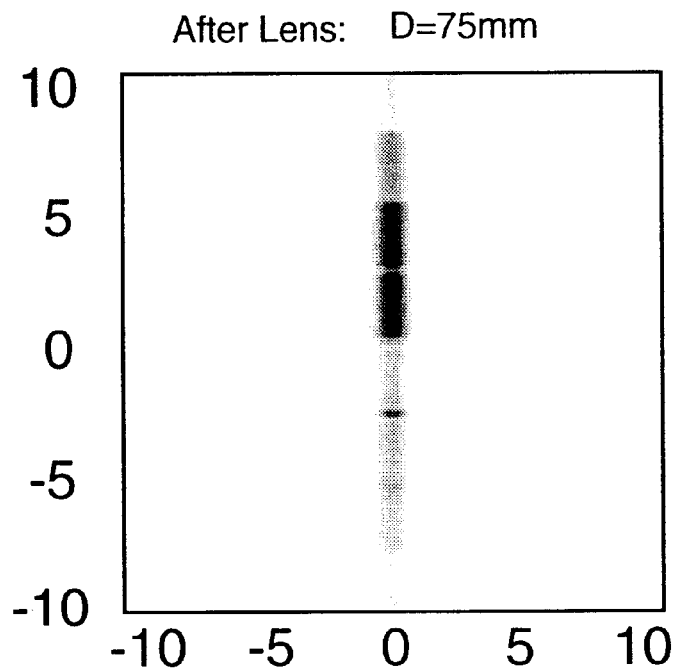
Figure 11F:
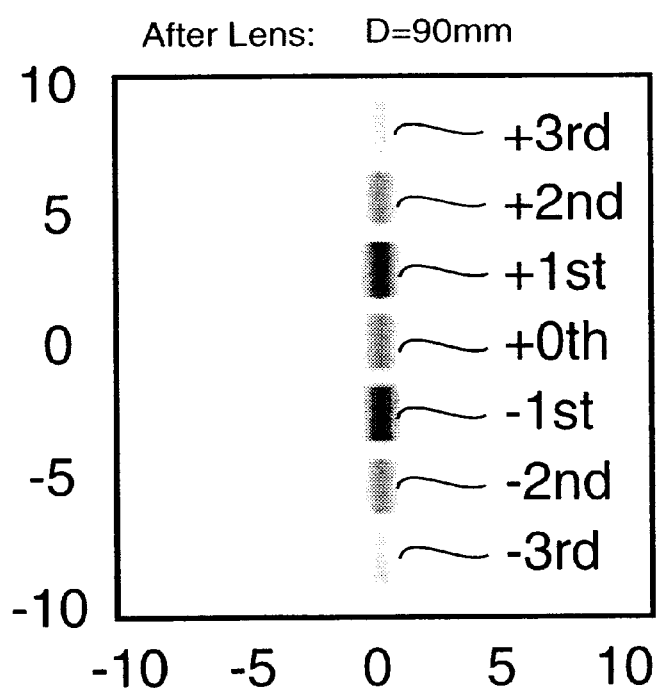
Figure 11G:
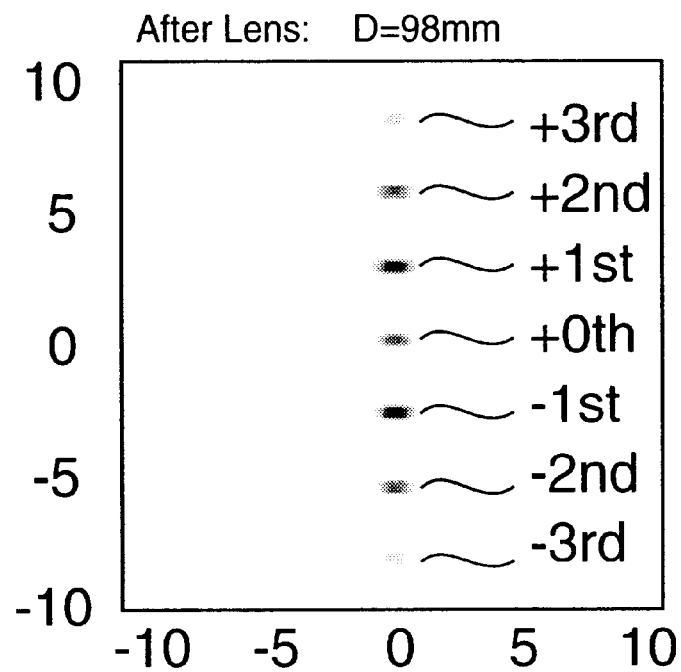
Figure 11H:
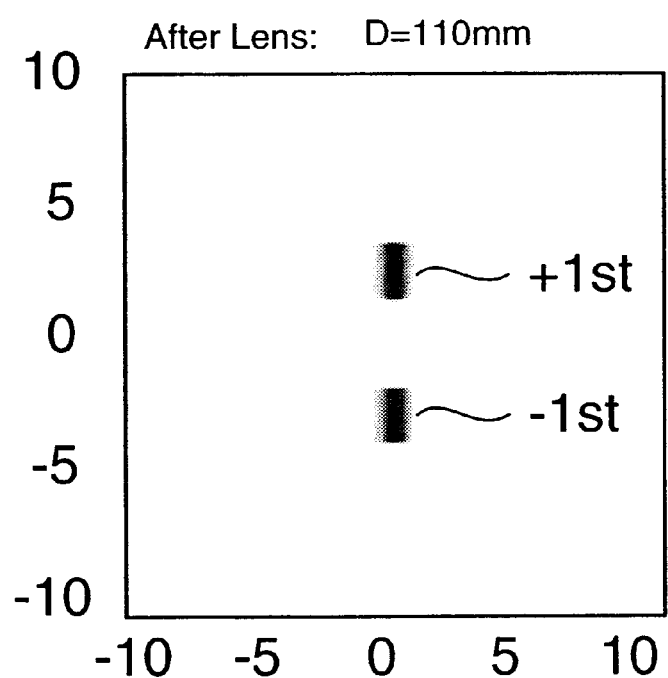
Figure 14:
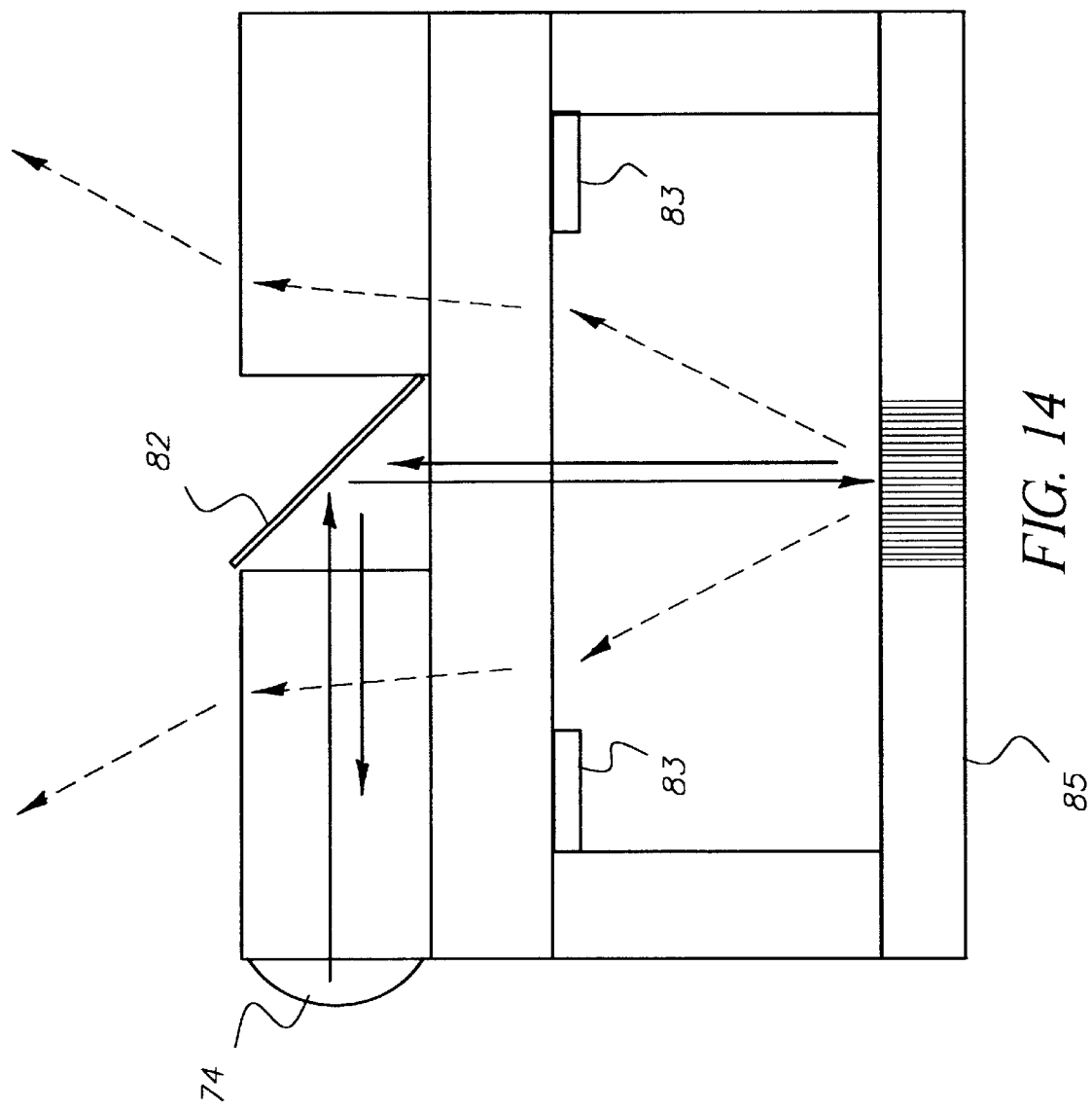
FIG. 14 is a schematic illustrating an optical subsystem for illumination and diffracted order separation in which the illumination optics, the linear array of electromechanical conformal grating devices, and the turning mirror are combined into a single mechanical structure.

The significant differences between the display system of the prior art (FIG. 7) and the present display system (FIG. 8) can be understood by examining the propagation of the diffracted light beams throughout the two systems. FIGS. 11*a*14 11*h* show the amplitude of the diffracted light beams along several parallel planes between the linear array 85 and the screen 90 for the prior art system of FIG. 7. In this modeled example, the lens has a focal length f of 50 mm, the linear array is 1 cm long. D refers to the distance between the linear array 85 to the plane of interest. As the diffracted light beams emerge from the linear array 85, they begin to spread along the direction of the axis of the linear array as illustrated in FIGS. 11*a*–11*d*. The interference between the various diffracted beams causes a rapid variation in the intensity known to those skilled in the art as tilt fringes. At the plane just before the projection lens (see FIG. 11*d*), the diffracted light beams have spread to about twice the length of the linear array. The lens must be large enough to avoid truncating the diffracted light beams to be projected on the screen, which are the −1st and +1st order light beams in this case. After passing through the projection lens system 75, the beams begin to focus. At a distance of D=90 mm from the linear array 85, the various diffracted orders are spatially separated. Distinct spots are visible that correspond to the +3rd, +2nd, +1st, 0th, −1st, −2nd and −3rd orders (see FIG. 11g). At the Fourier plane (D=100 mm), the turning mirror 82 blocks the 0th order light beam and a stop blocks the +3rd, +2nd, −2nd and −3rd orders. The +1st and −1st order light beams continue towards the screen 90 where they overlap spatially to form the line image. It is important to note that the various order light beams are only spatially separated near the Fourier plane (near D=100 mm). Therefore, only the vicinity of this plane is available for separating the +1st and −1st order light beams from the rest of the diffracted orders.

Figure 12A:
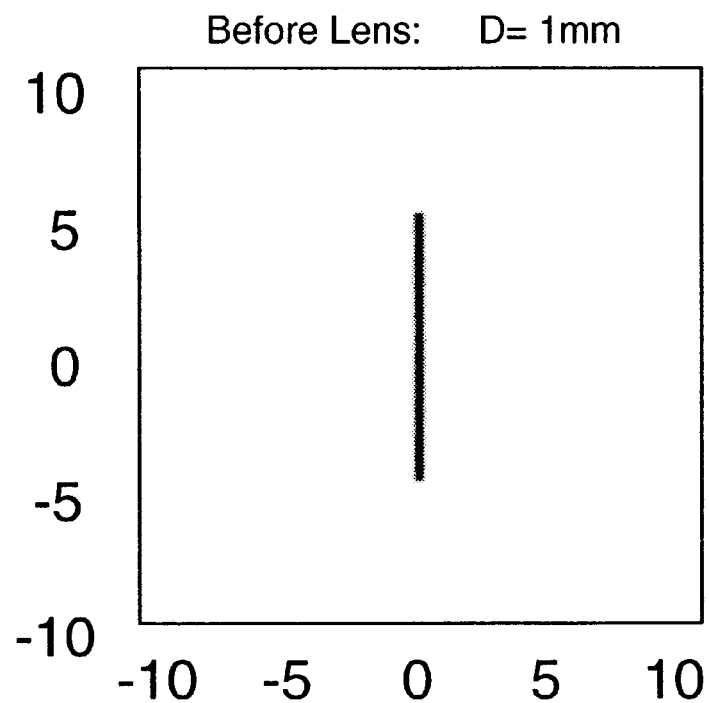
FIGS. 12a–12h are density plots of the light distribution in different planes of a line-scanned display system of the present invention in which the modulator is a linear array of electromechanical conformal grating devices.
Figure 12B:
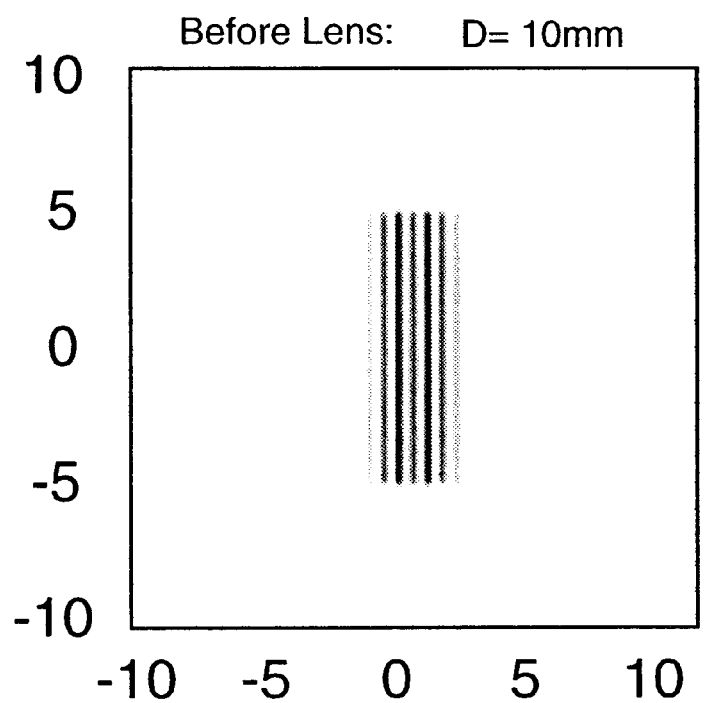
Figure 12C:
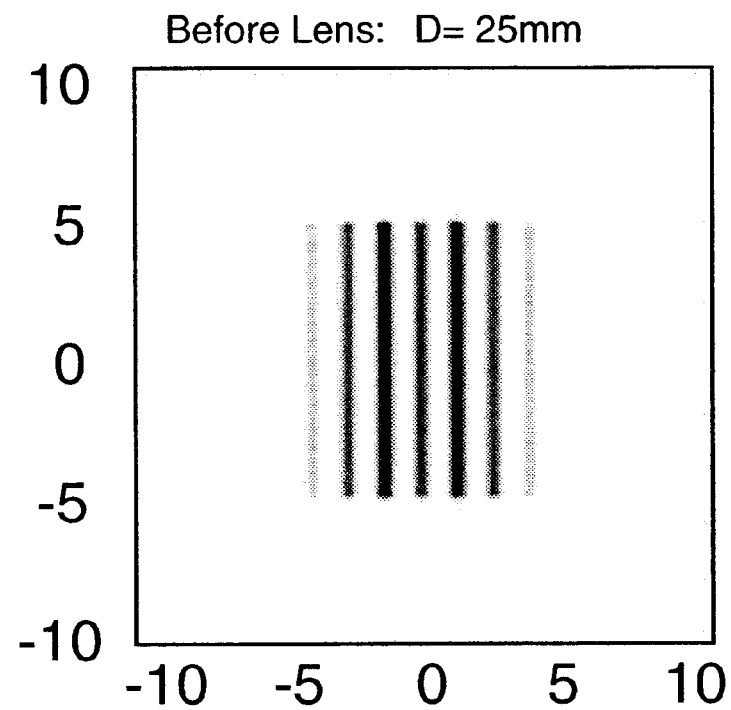
Figure 12D:
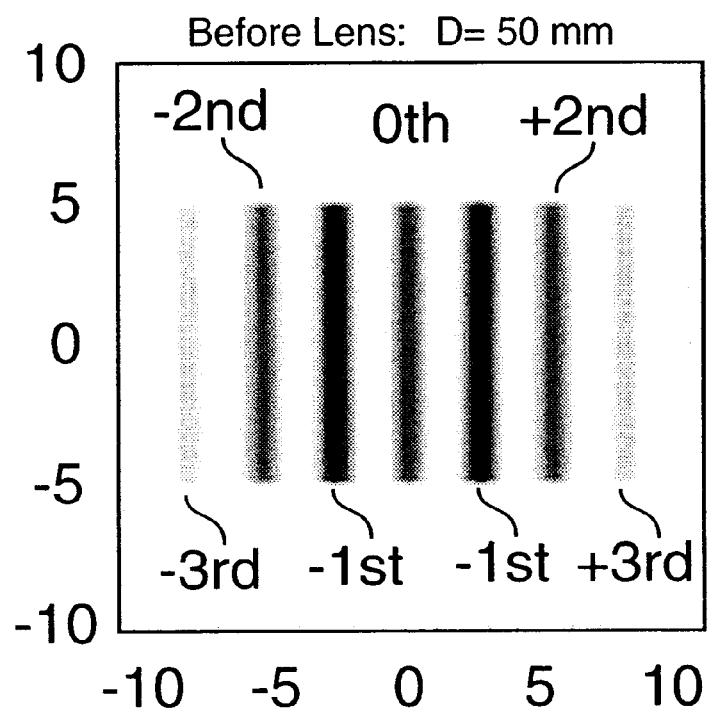
Figure 12E:
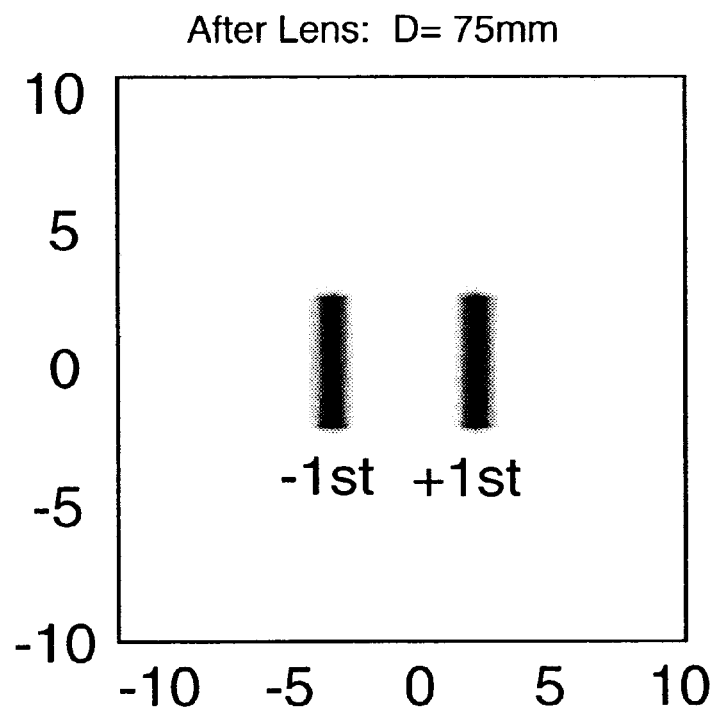
Figure 12F:
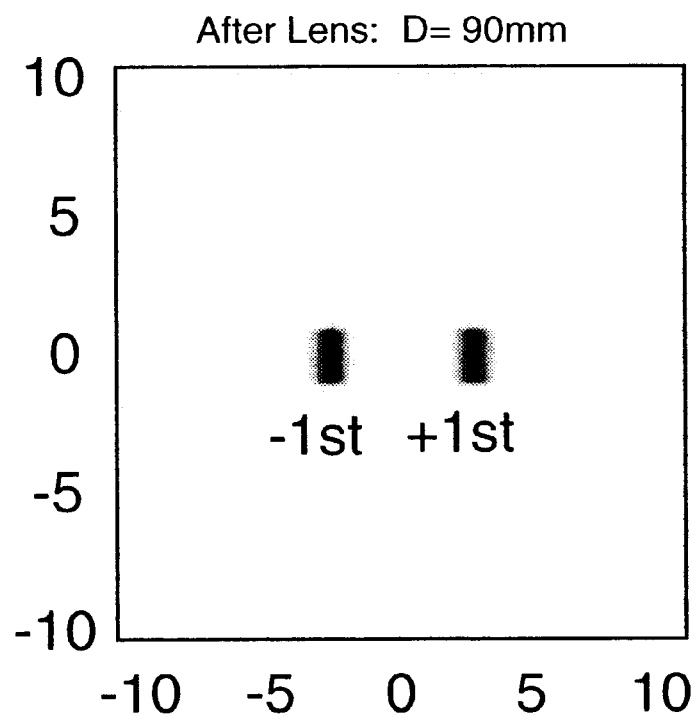
Figure 12G:
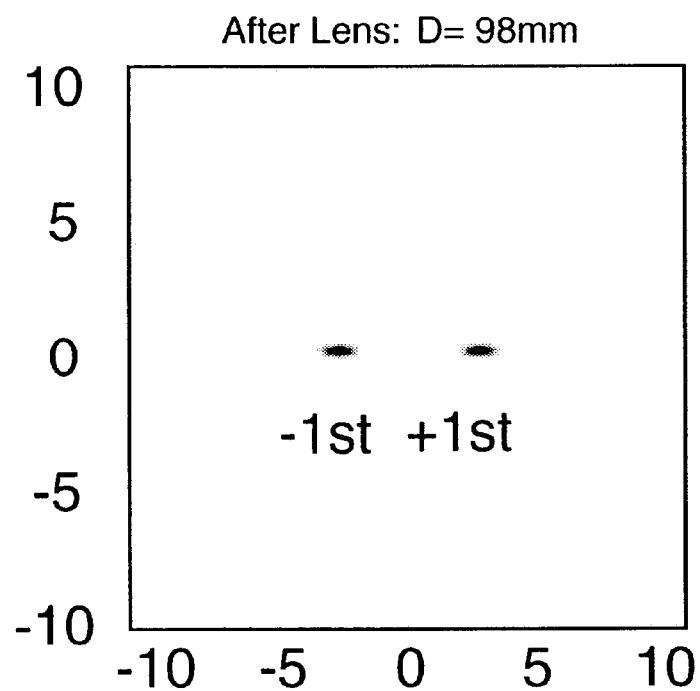
Figure 12H:
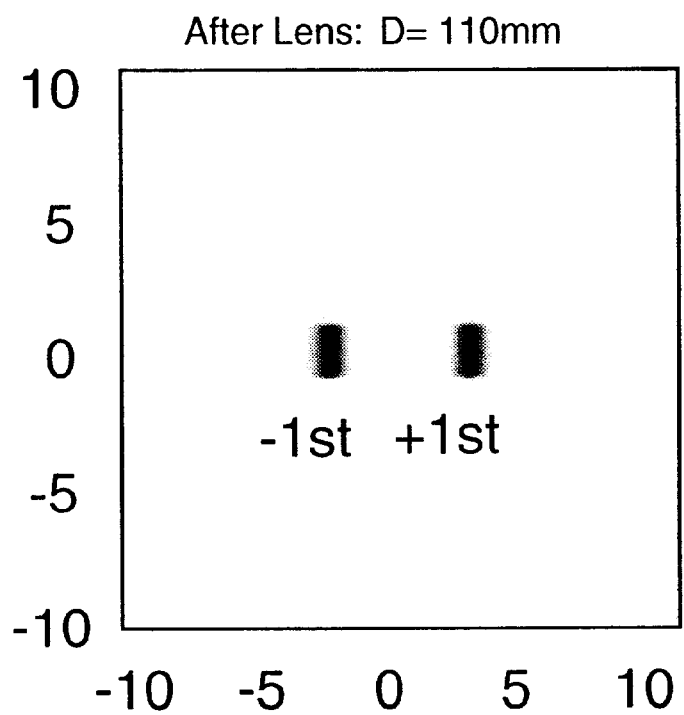

FIGS. 12a–12h show the amplitude of the diffracted light beams along several parallel planes for the display system of FIG. 8. In contrast to the prior art display system, as the various diffracted light beams propagate from one plane to the next, they spread out in a direction perpendicular to the axis of the linear array 85. They become spatially separated a few millimeters from the linear array 85 and remain spatially separated throughout the system, except near the screen 90 and any intermediate image planes. FIG. 12d shows the light distribution just before the turning mirror 82 and the stop 83, which block the unwanted diffracted orders. Only the +1st and −1st order light beams pass through the projection lens system 75. For better optical efficiency, higher diffracted orders could also be allowed through. FIGS. 12e–12h show the +1st and −1st order light beams after they have gone through the projection lens system and pass through focus at the Fourier plane (D=100 mm). Near the Fourier plane, the two first order light beams are tightly focused into two spots. Therefore, by placing the scanning mirror 77 here, it can be kept small and light. The +1st and −1st order light beams overlap spatially when they finally reach the screen 90.

Figure 13:
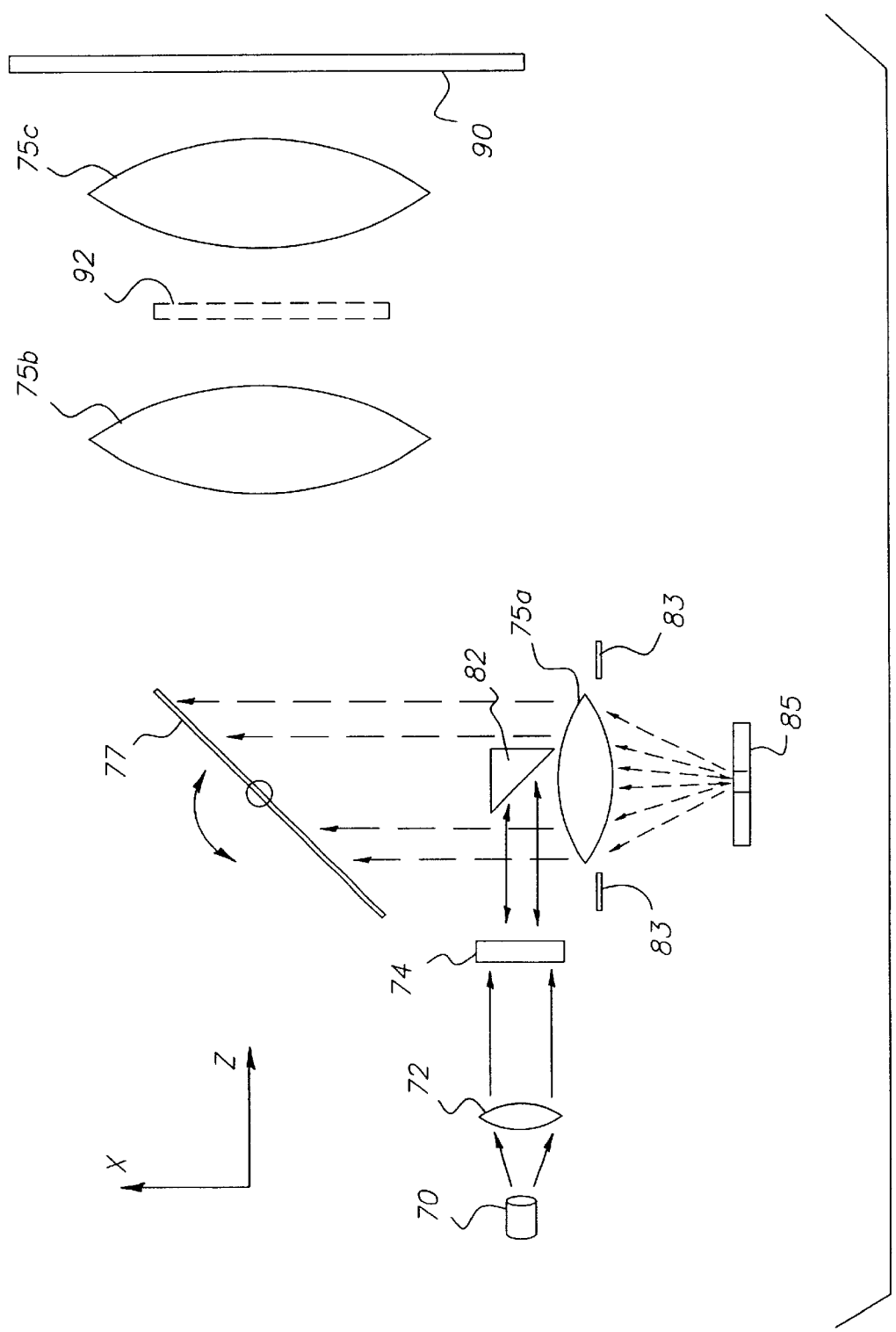
FIG. 13 is a schematic illustrating an alternate embodiment of the present invention in which the turning mirror is placed between the first projection lens and the scanning mirror, and an intermediate image plane is formed in the system.

An alternate embodiment of the invention is shown in FIG. 13. The projection lens system now consists of 3 separate lens groups 75a, 75b and 75c. The turning mirror 82 is placed between the first lens group 75a and the scanning mirror 77 adjacent to the first lens group 75a. This location for the turning mirror 82 can be beneficial because the diffracted light beams are collimated along one axis in this space. The cylinder lens axis 74 is rotated 90 degrees with respect to the cylinder lens of FIG. 8. The scanning mirror 77 is preferably placed at the Fourier plane (focal plane) of the first lens group 75a. The second lens group 75b creates an intermediate image 92 of the linear array 85 that can be used to modify the image appearing on the screen 90. For example, an aperture can be placed in this plane to create a sharp boundary for the image. The third lens group 75c projects the intermediate image 92 onto the screen 90.

Figure 15:
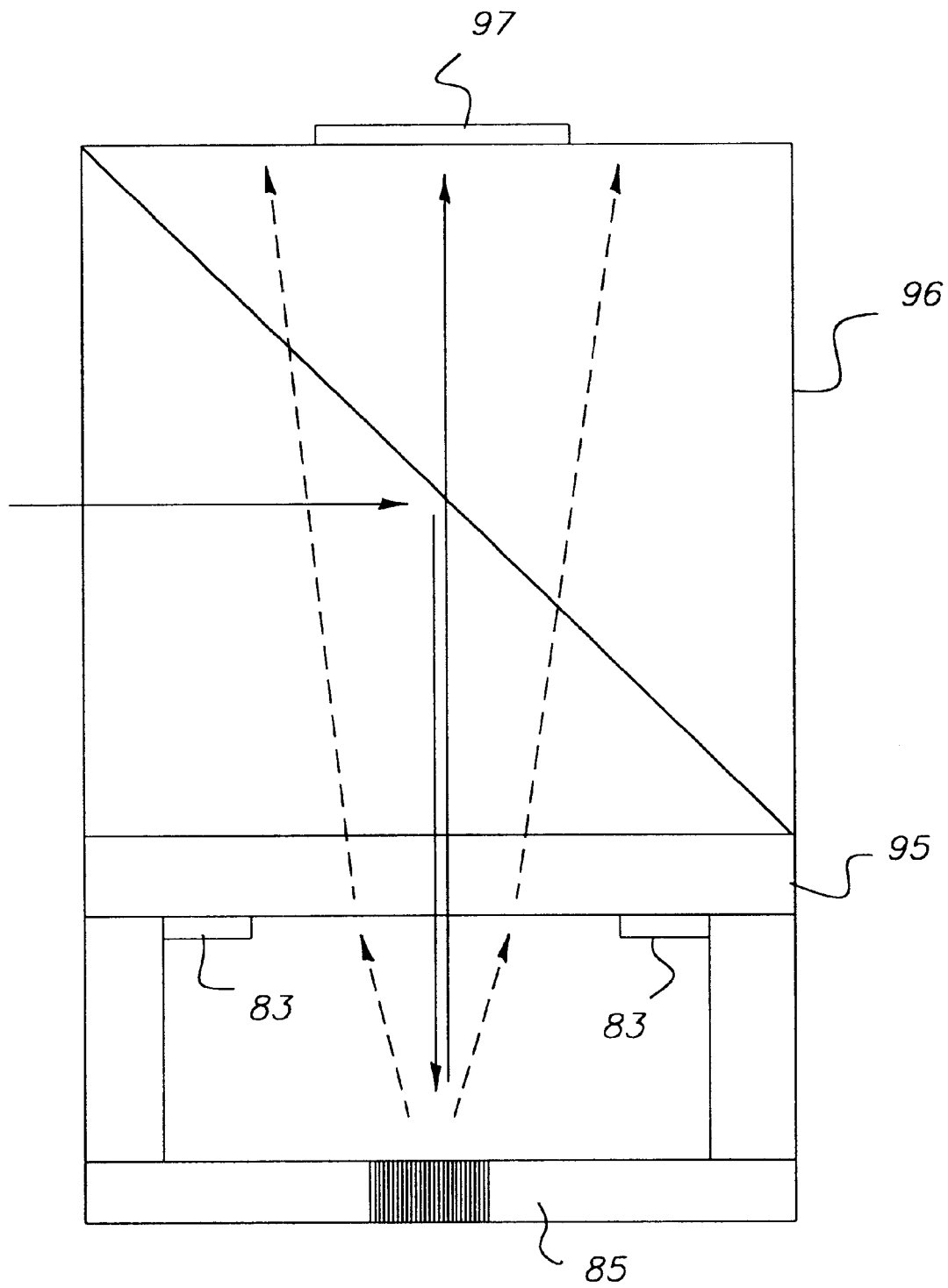
FIG. 15 is a schematic illustrating an optical subsystem for illumination and diffracted order separation in which the turning mirror is replaced by a polarization beam splitter, a quarter waveplate and a $0^{th}$ order stop.

In order to the improve alignment and stability of the system, some of the optical elements can be combined into a solid structure and/or can be replaced by equivalent components. As an example, FIG. 14 shows the combination of several components of FIG. 8, namely, of the cylinder lens 74, turning mirror 82, stop 83 and linear array 85. The turning mirror 82 may also be replaced by using a polarization beam splitter 96 with a ¼ waveplate 95 and a 0th order stop 97 as in FIG. 15.

The above embodiments can be used either for single color or for color-sequential display systems. For a color-sequential display, the light source 70 produces a plurality of colors that are sequential in time and the controller 80 is synchronized with the light source 70. For example, if the light source 70 consists of three combined red, green and blue lasers, these are turned on sequentially to produce overlapping red, green and blue images on the screen 90. The image data sent by the controller 80 to the linear array 85 is synchronized with the turned-on laser color.

Figure 16:
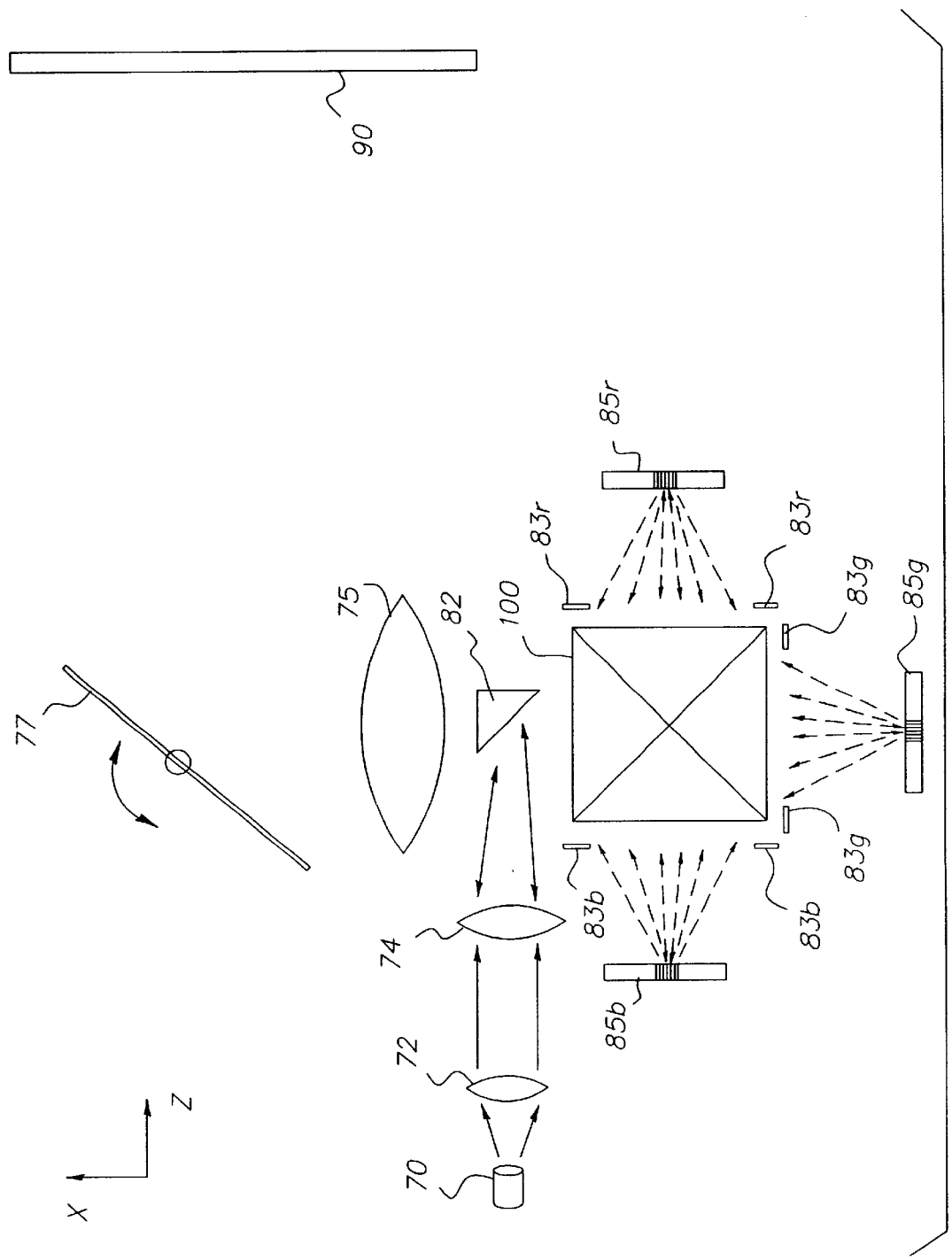
FIG. 16 is a schematic illustrating a color, line-scanned display system that includes a three-color light source, illumination optics, a color combination cube, three linear arrays of electromechanical conformal grating devices, a projection lens, a scanning mirror and a turning mirror located between the linear arrays and the projection lens.
Figure 17:
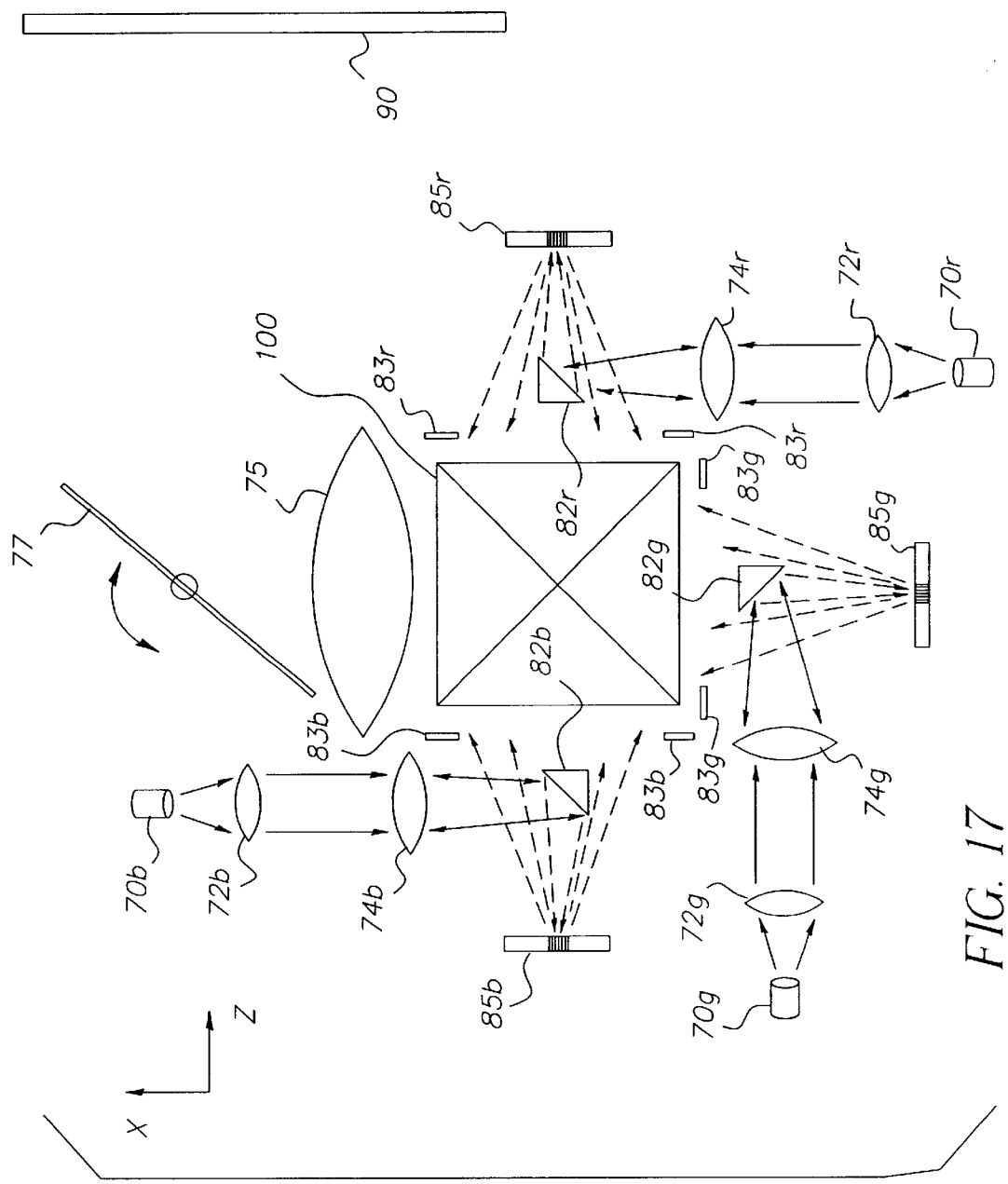
FIG. 17 is a schematic illustrating a color, line-scanned display system with three light sources.

Color-sequential display systems waste two-thirds of the available light because only one color is used at a time. FIGS. 16 and 17 depict embodiments of the invention that project three colors simultaneously. In FIG. 16, the light source 70 emits red, green and blue. After these three colors hit the turning mirror 82, they are separated by a color combination cube 100. Red light illuminates linear array 85r, green light linear array 85g and blue light linear array 85b. The +1st, 0th and −1st order light beams, emerging from the three linear arrays, are combined by the color combination cube 100. The turning mirror 82 blocks the red, green and blue 0th order light beams after they pass through the cube. The remaining +1st and −1st order light beams are imaged by the projection lens system 75 to form a color image at the screen 90. Three stops 83r, 83g, 83b block unwanted higher-order diffracted light beams.

Alternatively, a color-simultaneous display system can be made with three distinct illumination paths as shown in FIG. 17. Three separate light sources 70r, 70g, 70b, each with their own illumination optics 72r, 72g, 72b, 74r, 74g, 74b, provide light to the three linear arrays 85r, 85g, 85b via three turning mirrors 82r, 82g, 82b. The color combination cube 100 now serves only to combine the +1st and −1st order light beams of the three colors. In contrast to the display system of FIG. 17, the color combination cube 100 plays no role in illuminating the device.

Figure 18:
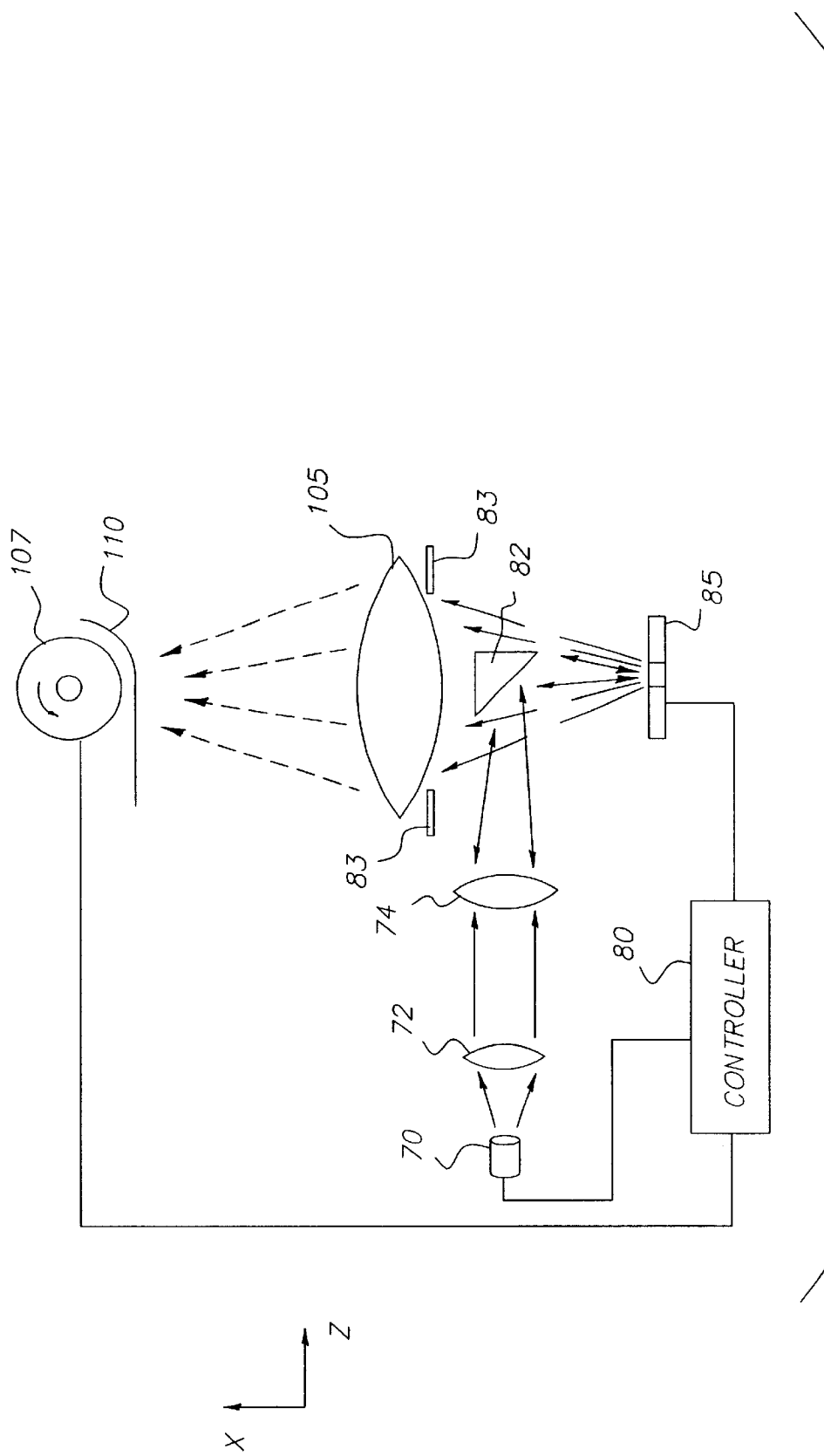
FIG. 18 is a schematic illustrating a printer system that includes a light source, illumination optics, a linear array of electromechanical conformal grating devices, an imaging lens, a rotating drum, light sensitive media, a controller and a turning mirror located between the linear array and the projection lens.
Figure 19:
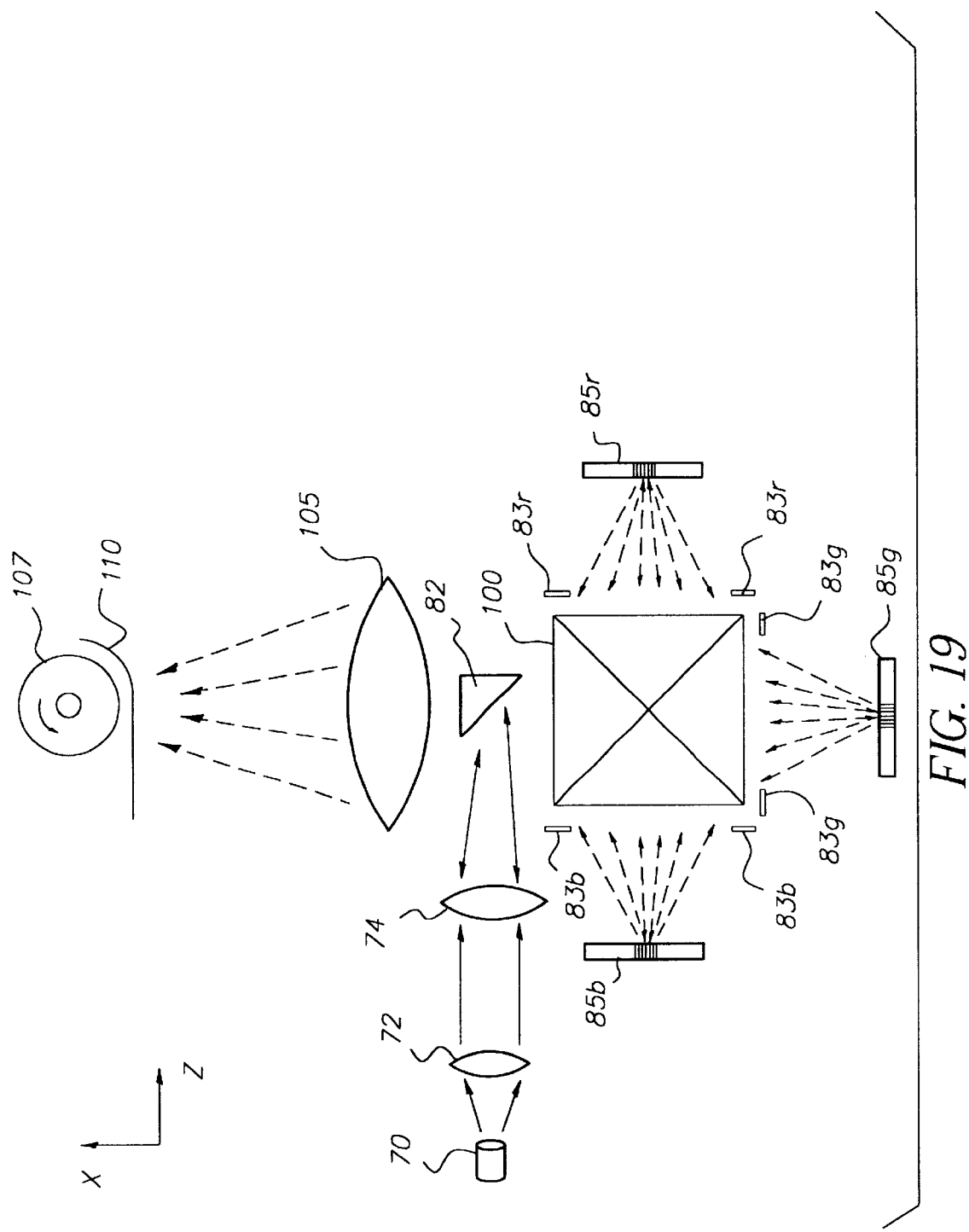
FIG. 19 is a schematic illustrating a color printer system with a three-color light source, a color combination cube and three linear arrays of electromechanical conformal grating devices.

The embodiments described above can be altered to obtain printing systems. For example, FIG. 18 shows a printer that is fashioned from the building blocks in FIG. 8. Light emitted by source 70 is conditioned by a spherical lens 72 and a cylindrical lens 74 before hitting the turning mirror 82 and focusing on the linear array 85 of electromechanical conformal grating devices. An imaging lens 105 is used at finite conjugates to create a line image of the linear array 85 on light sensitive media 110. This line image is formed from the (non-obstructed) diffracted light beams that pass between the turning mirror 82 and the stops 83. Although a scanning mirror 77 could be used to create a two-dimensional image from the line image, it is usually preferable to use a media transport system to move the light sensitive media 110 with respect to the line image. In FIG. 18, the media transport system has a rotating drum 107. The motion of the media must be synchronized with the actuation of the electromechanical conformal grating devices of the linear array 85 by the controller 80. This embodiment can be used for either a monochrome or a color-sequential printer. To obtain a high-speed printer that can print three colors simultaneously on photographic paper, three linear arrays are necessary. FIG. 19 shows an embodiment of a color-simultaneous printer fashioned from the building blocks in FIG. 16 with the following changes: an imaging lens 105 used at finite conjugates replaces the projection lens 75, light sensitive media 110 replaces the screen 90 and a rotating drum 107 for moving the light sensitive media 110 replaces the scanning mirror 77.

The invention has been described in detail with particular reference to certain preferred embodiments thereof, but it will be understood that variations and modifications can be effected within the spirit and scope of the invention.

PARTS LIST 5a conformal grating device
5b conformal grating device
5c conformal grating device
5d conformal grating device
10 substrate
12 bottom conductive layer
14 protective layer
16 standoff layer
18 spacer layer
20 ribbon layer
22 reflective layer
23a elongated ribbon element
23b elongated ribbon element
23c elongated ribbon element
23d elongated ribbon element
24a end support
24b end support
25 channel
27 intermediate support
28 gap
29 standoff
30 incident light beam
32 0th order light beam
35a +1$^{st}$ order light beam
35b −1$^{st}$ order light beam
36a +2$^{nd}$ order light beam
36b −2$^{nd}$ order light beam
40 substrate
42 bottom conductive layer
44 protective layer
45a GLV device
45b GLV device
45c GLV device
45d GLV device
45e GLV device
46 ribbon element
46a movable ribbon element
46b stationary ribbon element
48 reflective and conductive layer
50 channel
54 incident light beam
55 0th order light beam
56 incident light beam
57 +1st order light beam
58 −1 st order light beam
60a channel
60b channel
60c channel
60d channel
60e channel
62a GLV device
62b GLV device
62c GLV device
62d GLV device
62e GLV device
70 source
70r red source
70g green source
70b b blue source
72 spherical lens
72r spherical lens
72g spherical lens
72b spherical lens
74 cylindrical lens
74r cylindrical lens
74g cylindrical lens
74b cylindrical lens
75 projection lens system
75a first lens group
75b second lens group
75c third lens group
77 scanning mirror
80 controller
82 turning mirror
82r turning mirror
82g turning mirror
82b turning mirror
83 stop
83r stop
83g stop
83b stop
85 linear array
85r linear array
85g linear array
85b linear array
88 line of light
90 screen
92 intermediate image
95 ¼ waveplate
96 polarization beam splitter
97 0th order stop
100 color combination cube
105 imaging lens
107 rotating drum
110 light sensitive media

What is claimed is:

1. A display system, comprising:
a light source providing illumination;
a linear array of electromechanical grating devices of at least two individually operable devices receiving the illumination wherein a grating period is oriented at a predetermined angle with respect to a long axis of the linear array; the long axis of the linear array being directionally defined by the adjacent location of the at least two individually operable devices in relationship to each other, wherein the predetermined angle is large enough to separate diffracted light beams prior to a lens system for projecting light onto a screen;
an obstructing element for blocking a discrete number of diffracted light beams from reaching the screen;
a scanning element for moving non-obstructed diffracted light beams on the screen; and
a controller for providing a data stream to the individually operable devices.

2. The display system of claim 1, wherein the linear array is constructed of electromechanical conformal grating devices.

3. The display system of claim 1, wherein the linear array is constructed of electromechanical grating light valves.

4. The display system of claim 1, wherein a direction of the grating period is such that the grating period is perpendicular to the long axis of the linear array.

5. The display system of claim 1, wherein the light source is of a single color.

6. The display system of claim 1, wherein the light source produces a plurality of colors that are sequential in time and the controller is synchronized with the light source.

7. The display system of claim 1, wherein the light source produces a plurality of colors at the same time and the display system includes a corresponding number of linear arrays of electromechanical grating devices.

8. The display system of claim 1 comprising at least three light sources and includes a corresponding number of linear arrays of electromechanical grating devices.

9. The display system of claim 1, wherein the obstructing element blocks a zeroth order diffracted light beam.

10. The display system of claim 9, wherein the obstructing element only allows first order diffracted light beams to reach the screen.

11. The display system of claim 1, wherein the obstructing element is placed between the linear array and a first lens of the lens system.

12. The display system of claim 1, wherein the obstructing element is placed after a first lens and before a Fourier plane of the lens system.

13. The display system of claim 1, wherein the scanning element is placed at a Fourier plane of the lens system and the obstructing element is placed between the linear array and the scanning element.

14. The display system of claim 1, wherein the light source is a laser.

15. The display system of claim 1, wherein the obstructing element is simultaneously used for delivery of light from the light source to the linear array.

16. The display system of claim 1, wherein the lens system includes an intermediate image plane after the scanning element wherein a two-dimensional image is formed and is relayed to the screen.

17. The display system of claim 15, wherein the obstructing element further includes:
a polarization sensitive beam splitter;
a waveplate; and
a stop to block a zeroth order diffracted light beam.

18. A display system, comprising:
a light source providing illumination;
a linear array of electromechanical conformal grating devices of at least two individually operable devices receiving the illumination wherein a grating period is oriented perpendicular to a long axis of the linear array to separate diffracted light beams prior to a lens system for projecting light onto a screen; the long axis of the linear array being directionally defined by the adjacent location of the at least two individually operable devices in relationship to each other;
an obstructing element for blocking a discrete number of diffracted light beams from reaching the screen;
a scanning element for moving non-obstructed diffracted light beams on the screen; and
a controller for providing a data stream to the individually operable devices.

19. The display system of claim 18, wherein the obstructing element blocks a zeroth order diffracted light beam.

20. The display system of claim 19, wherein the obstructing element only allows first order diffracted light beams to reach the screen.

21. The display system of claim 18, wherein the obstructing element is placed between the linear array and a first lens of the lens system.

22. The display system of claim 18, wherein the obstructing element is placed after a first lens and before a Fourier plane of the lens system.

23. The display system of claim 18, wherein the scanning element is placed at a Fourier plane of the lens system and the obstructing element is placed between the linear array and the scanning element.

24. The display system of claim 18, wherein the obstructing element is simultaneously used for delivery of light from the light source to the linear array.

25. The display system of claim 24, wherein the obstructing element further comprises:
a polarization sensitive beam splitter;
a waveplate; and
a stop to block a zeroth order diffracted light beam.

26. A display system, comprising:
a light source providing illumination;
a linear array of electromechanical grating devices of at least two individually operable devices receiving the illumination wherein a grating period is oriented at a predetermined angle with respect to a long axis of the linear array; the long axis of the linear array being directionally defined by the adjacent location of the at least two individually operable devices in relationship to each other, wherein the predetermined angle is large enough to separate diffracted light beams prior to a lens system for projecting light onto a screen;
an obstructing element for blocking a discrete number of the diffracted light beams from reaching the screen;
a scanning element placed at a Fourier plane of the lens system for moving non-obstructed diffracted light beams on the screen; and
a controller for providing a data stream to the individually operable devices.

27. The display system of claim 26, wherein the linear array is constructed of electromechanical conformal grating devices.

28. The display system of claim 26, wherein the linear array is constructed of electromechanical grating light valves.

29. The display system of claim 26, wherein a direction of the grating period is such that the grating period is perpendicular to the long axis of the linear array.

30. The display system of claim 26, wherein the obstructing element blocks a zeroth order diffracted light beam.

31. The display system of claim 26, wherein the obstructing element only allows first order diffracted light beams to reach the screen.

32. The display system of claim 26, wherein the obstructing element is placed between the linear array and a first lens of the lens system.

33. The display system of claim 26, wherein the obstructing element is placed after the first lens and before a Fourier plane of the lens system.

34. The display system of claim 26, wherein the obstructing element is simultaneously used for delivery of light from the light source to the linear array.

35. The display system of claim 34, wherein the obstructing element further comprises:
a polarization sensitive beam splitter;
a waveplate; and
a stop to block a zeroth order diffracted light beam.

36. A printing system for printing on a light sensitive medium, comprising:
a light source providing illumination;
a linear array of electromechanical grating devices of at least two individually operable devices receiving the illumination wherein a grating period is oriented at a predetermined angle with respect to a long axis of the linear array; the long axis of the linear array being directionally defined by the adjacent location of the at least two individually operable devices in relationship to each other, wherein the predetermined angle is large enough to separate diffracted light beams prior to a lens system that creates an image;

an obstructing element for blocking a discrete number of diffracted light beams prior to the image; and a controller for providing a data stream to the individually operable devices.

37. The printing system of claim 36, wherein the linear array is constructed of electromechanical conformal grating devices.

38. The printing system of claim 36, wherein the linear array is constructed of electromechanical grating light valves.

39. The display system of claim 36, wherein a direction of the grating period is such that the grating period is perpendicular to the long axis of the linear array.

40. The printing system of claim 36, wherein the light source is of a single color.

41. The printing system of claim 36, wherein the light source produces a plurality of colors that are sequential in time and the controller is synchronized with the light source.

42. The printing system of claim 36, wherein the light source produces a plurality of colors simultaneously and the printing system includes a corresponding plurality of linear arrays of electromechanical grating devices.

43. The printing system of claim 36 comprises at least three light sources and includes a corresponding number of linear arrays of electromechanical grating devices.

44. The printing system of claim 36, wherein the obstructing element blocks a zeroth order diffracted light beam.

45. The printing system of claim 44, wherein the obstructing element only allows first order diffracted light beams to reach the light sensitive medium.

46. The printing system of claim 36, wherein the obstructing element only allows zeroth order diffracted light beams to reach the light sensitive medium.

47. The printing system of claim 36, wherein the obstructing element is placed between the linear array and a first lens of the lens system.

48. The printing system of claim 36, wherein the obstructing element is placed after a first lens and before a Fourier plane of the lens system.

49. The printing system of claim 36, wherein the light source is a laser.

50. The printing system of claim 36, wherein the obstructing element is simultaneously used for delivery of light from the light source to the linear array.

51. The printing system of claim 36, wherein the lens system includes an intermediate image before a final image.

52. The printing system of claim 36, wherein the obstructing element further comprises:

a polarization sensitive beam splitter;

a waveplate; and a stop to block a zeroth order diffracted light beam.

* * * * *

UNITED STATES PATENT AND TRADEMARK OFFICE
CERTIFICATE OF CORRECTION

PATENT NO.     : 6,411,425 B1
DATED          : June 25, 2002
INVENTOR(S)    : Marek W. Kowarz et al.

It is certified that error appears in the above-identified patent and that said Letters Patent is hereby corrected as shown below:

<u>Title page,</u>
*Attorney, Agent, or Firm,* attorney name: delete "Stephen S. Shaw" and insert
-- Stephen H. Shaw --.

Signed and Sealed this

Twenty-seventh Day of August, 2002

Attest:

Attesting Officer

JAMES E. ROGAN
*Director of the United States Patent and Trademark Office*